United States Patent
Kim et al.

(10) Patent No.: US 8,723,811 B2
(45) Date of Patent: May 13, 2014

(54) MOBILE TERMINAL AND SCREEN DISPLAYING METHOD THEREOF

(75) Inventors: Dong Kyu Kim, Seoul (KR); Wan Ho Ju, Seoul (KR); Tae Hun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1079 days.

(21) Appl. No.: 12/402,035

(22) Filed: Mar. 11, 2009

(65) Prior Publication Data

US 2009/0237371 A1   Sep. 24, 2009

(30) Foreign Application Priority Data

Mar. 21, 2008  (KR) .................. 10-2008-0026463
Mar. 21, 2008  (KR) .................. 10-2008-0026466
Mar. 21, 2008  (KR) .................. 10-2008-0026468

(51) Int. Cl.
*G06F 3/041*   (2006.01)

(52) U.S. Cl.
USPC ......... 345/173; 345/174; 345/175; 178/18.01

(58) Field of Classification Search
None
See application file for complete search history.

(56) References Cited

U.S. PATENT DOCUMENTS

| | | | | |
|---|---|---|---|---|
| 7,184,064 B2 * | 2/2007 | Zimmerman et al. | ........ | 345/684 |
| 7,970,438 B2 * | 6/2011 | Yoon et al. | .................... | 455/566 |
| 8,154,523 B2 * | 4/2012 | Miller et al. | ................... | 345/173 |
| 8,310,456 B2 * | 11/2012 | Kim et al. | ...................... | 345/173 |
| 2002/0167488 A1 | 11/2002 | Hinckley et al. | | |
| 2004/0021644 A1 | 2/2004 | Enomoto | | |
| 2005/0168489 A1 * | 8/2005 | Ausbeck, Jr. | ................. | 345/672 |
| 2006/0026536 A1 * | 2/2006 | Hotelling et al. | ............. | 715/863 |
| 2006/0161871 A1 * | 7/2006 | Hotelling et al. | ............. | 715/863 |
| 2006/0238517 A1 * | 10/2006 | King et al. | ..................... | 345/173 |
| 2006/0267966 A1 * | 11/2006 | Grossman et al. | ............ | 345/179 |
| 2006/0279548 A1 | 12/2006 | Geaghan | | |
| 2007/0236475 A1 * | 10/2007 | Wherry | ......................... | 345/173 |
| 2008/0034316 A1 * | 2/2008 | Thoresson | .................... | 715/781 |
| 2008/0122796 A1 | 5/2008 | Jobs et al. | | |
| 2008/0165141 A1 * | 7/2008 | Christie | ........................ | 345/173 |
| 2008/0196945 A1 | 8/2008 | Konstas | | |
| 2009/0039176 A1 | 2/2009 | Davidson et al. | | |
| 2009/0051660 A1 * | 2/2009 | Feland et al. | .................. | 345/173 |
| 2009/0139778 A1 * | 6/2009 | Butler et al. | ............... | 178/18.03 |
| 2011/0012848 A1 | 1/2011 | Li et al. | | |

FOREIGN PATENT DOCUMENTS

JP          8-212005        5/1996

* cited by examiner

*Primary Examiner* — Dismery Mercedes
(74) *Attorney, Agent, or Firm* — Lee, Hong, Degerman, Kang & Waimey

(57) ABSTRACT

The present invention relates to a mobile terminal. Specifically to a mobile terminal including a display including a touchscreen, a sensing unit for sensing an object contacting the touchscreen and the object in near-proximity to the touchscreen, and a controller for controlling information appearing on the display according to the object contacting the touchscreen and movement of the object relative to the touchscreen.

46 Claims, 43 Drawing Sheets

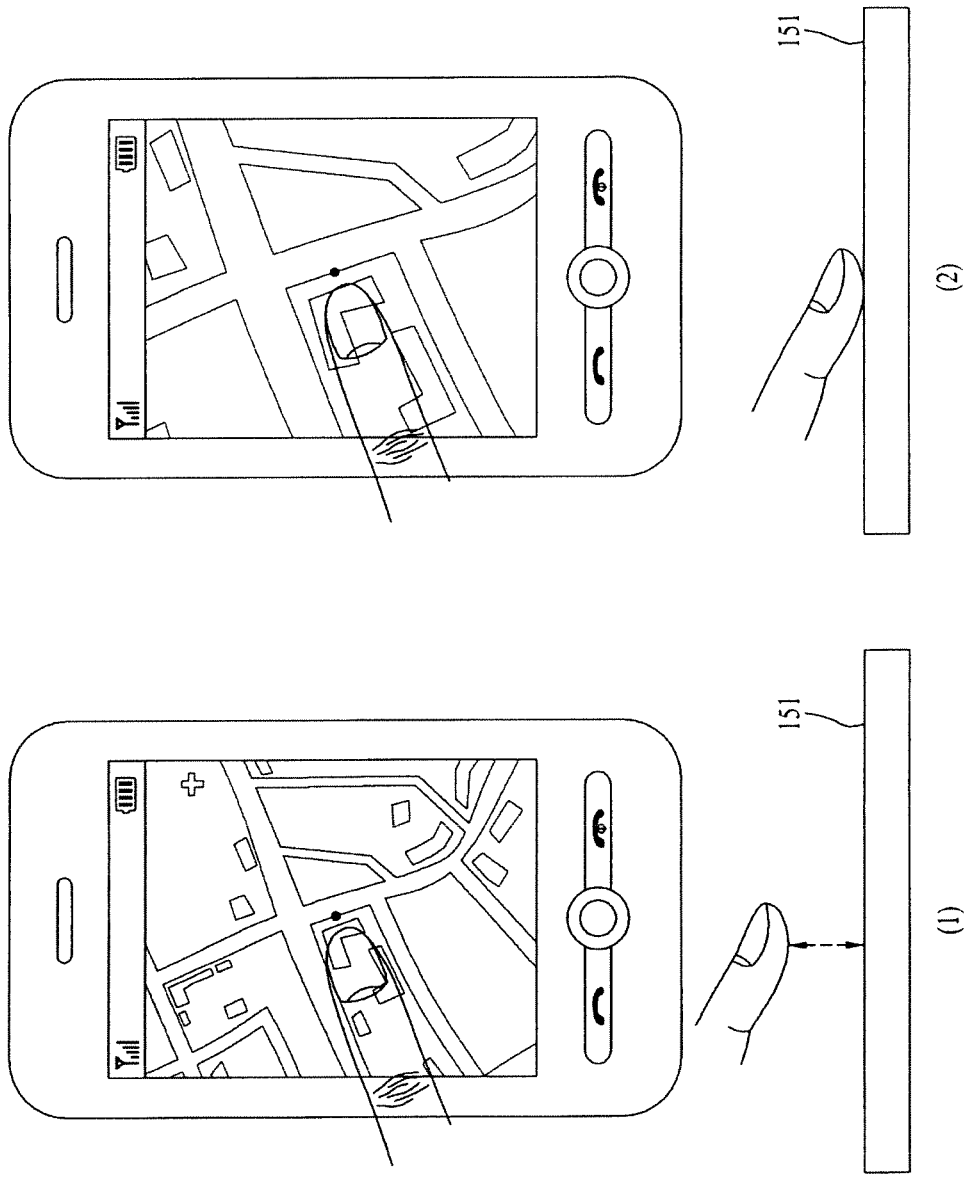

FIG. 39
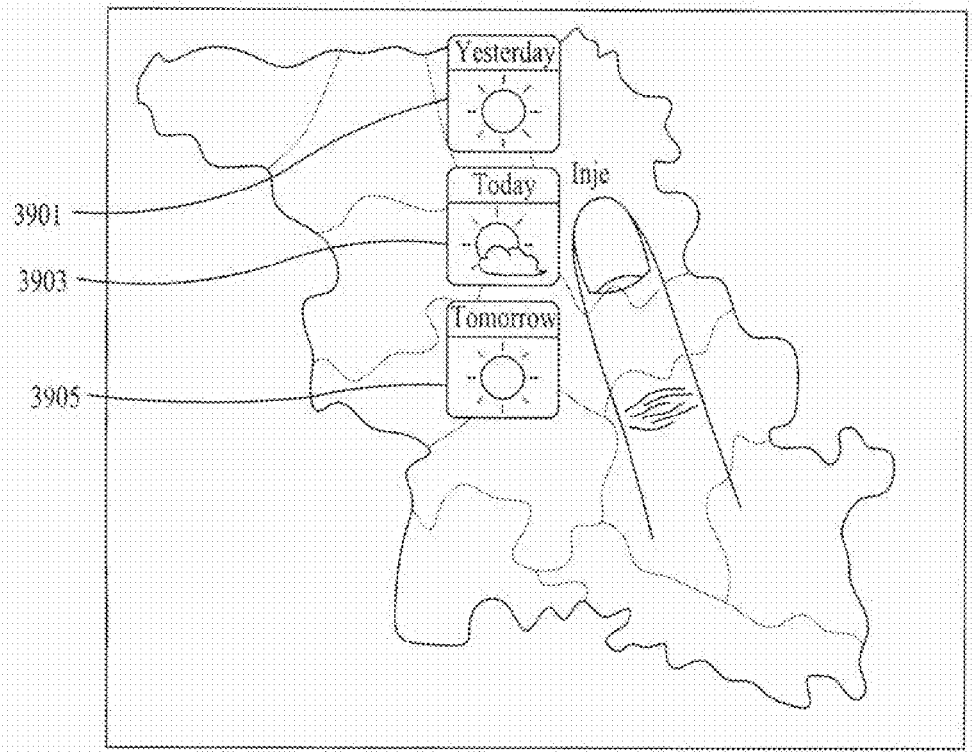
(a)
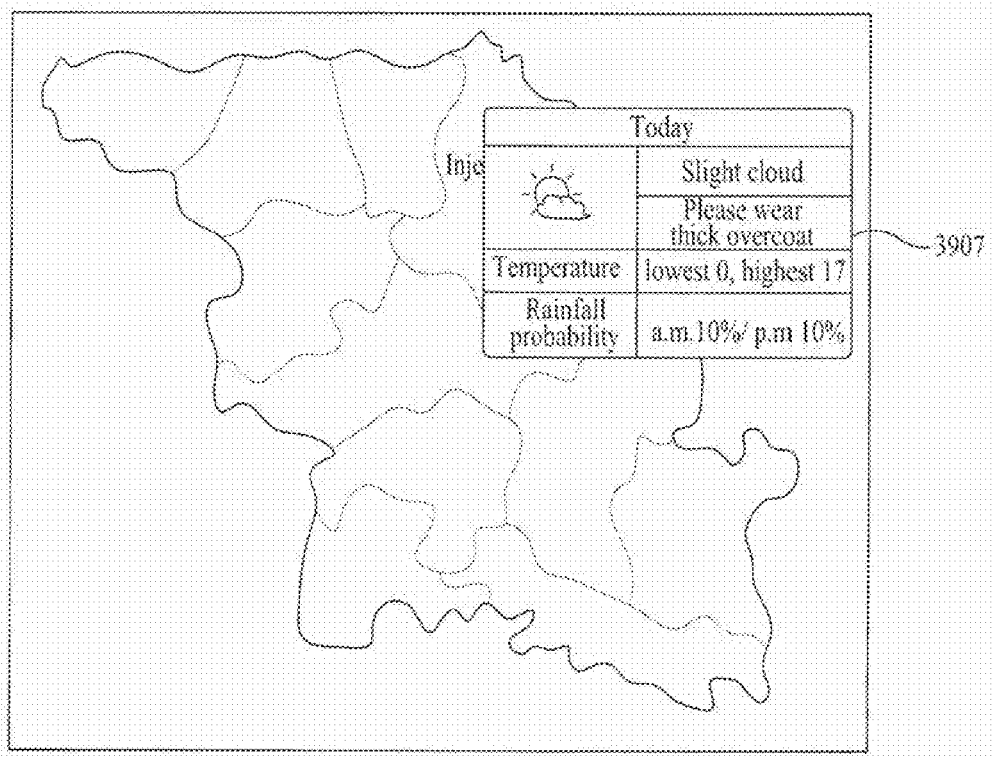
(b)

MOBILE TERMINAL AND SCREEN DISPLAYING METHOD THEREOF

Pursuant to 35 U.S.C. §119(a), this application claims the benefit of earlier filing date and right of priority to Korean Application No. 10-2008-0026463, filed on Mar. 21, 2008, Korean Application No. 10-2008-0026466, filed on Mar. 21, 2008, and Korean Application No. 10-2008-0026468, filed on Mar. 21, 2008 the contents of which are hereby incorporated by reference herein in their entirety

BACKGROUND OF THE INVENTION

1. Field of the Invention

The present invention relates to a mobile terminal, specifically to a mobile terminal including a proximity-touch input screen.

2. Discussion of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

SUMMARY OF THE INVENTION

Accordingly, the present invention is directed a mobile terminal capable of displaying a screen using a proximity-touch and a method thereof.

An object of the present invention is to provide a mobile terminal and a method thereof, that may perform a movement function and a zoom function of the touch screen based on the relation of a touch and a proximity-touch on a touch screen Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a display including a touchscreen, a sensing unit for sensing an object contacting the touchscreen and the object in near-proximity to the touchscreen, and a controller for controlling information appearing on the display according to the object contacting the touchscreen and movement of the object relative to the touchscreen.

In one feature, the controller applies a scrolling function to the information appearing on the display when the object contacts a predetermined point on the touchscreen and moves away from the predetermined point while in near-proximity to the touchscreen. The controller applies the scrolling function as long as the distance moved by the object is greater than or equal to a predetermined distance. Additionally, the control may control a scroll speed according to the distance moved by the object. Furthermore, the controller controls at least one of a scroll direction and a scroll speed according to a direction of movement of the object.

In another feature, the controller applies a zoom function to the information appearing on the display when the object contacts a predetermined point on the touchscreen and moves away from the predetermined point while in near-proximity to the touchscreen. Additionally, the controller applies a rotation function to the information appearing on the display when the object contacts a predetermined point on the touchscreen and rotationally moves with respect to the predetermined point while in near-proximity to the touchscreen In yet another feature, the controller displays a function icon when the object is near-proximity to the touchscreen.

In still yet another feature, the controller applies a zoom function to the information appearing on the display when the object contacts a predetermined portion of the function icon and linearly moves with respect to the predetermined portion while contacting the touchscreen. The controller applies a rotation function to the information appearing on the display when the object contacts a predetermined portion of the function icon and rotationally moves with respect to the predetermined portion while contacting the touchscreen.

In another embodiment, a method for controlling information displayed on a mobile terminal is presented. The method includes displaying information on a display of a touchscreen, sensing an object contacting the touchscreen and the object in near-proximity to the touchscreen, and controlling the information appearing on the display according to the object contacting the touchscreen and movement of the object relative to the touchscreen.

It is to be understood that both the foregoing general description and the following detailed description of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIGS. 39 and 40 illustrate examples of displaying weather information using the proximity-touch in the mobile terminal according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

By way of non-limiting example only and for convenience and conciseness of the following description, the present invention is illustrated as a mobile phone. It is not intended to limit the scope of the present invention. The teachings of the present invention apply equally to other types of terminals.

Figure 1:
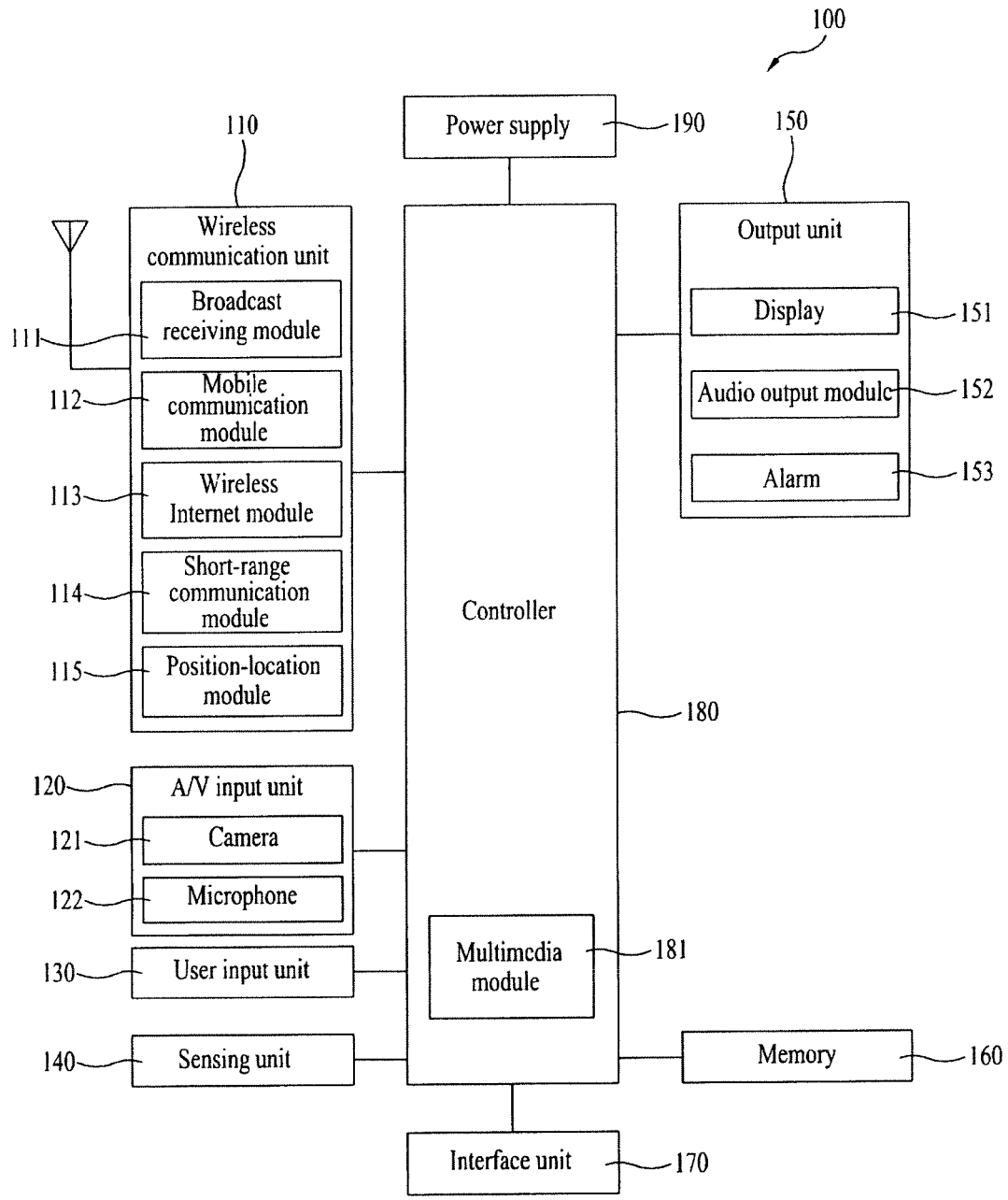
FIG. 1 illustrates a block diagram of a mobile terminal in accordance with an embodiment of the present invention.

FIG. 1 is a block diagram of a mobile terminal 100 in accordance with an embodiment of the present invention. The mobile terminal 100 may be implemented as a variety of terminal types. Examples of such terminals include mobile phones, user equipment, smart phones, computers, digital broadcast terminals, personal digital assistants, portable multimedia players (PMP), and navigators.

By way of non-limiting example only and for convenience and conciseness of the following description, the present invention is illustrated as a mobile phone. It is not intended to limit the scope of the present invention. The teachings of the present invention apply equally to other types of terminals.

FIG. 1 shows the terminal 100 having various components, but it is understood that implementing all of the illustrated components is not a requirement. Greater or fewer components may alternatively be implemented.

FIG. 1 shows a wireless communication unit 110 configured with various components. For example, the wireless communication unit 110 typically includes one or more components which permit wireless communication between the mobile terminal 100 and a wireless communication system or network within which the mobile terminal is located. In case of non-mobile terminals, the wireless communication unit 110 may be replaced with a wired communication unit. The wireless communication unit 110 and wire communication unit may be commonly referred to as a communication unit.

A broadcast receiving module 111 receives a broadcast signal and broadcast associated information from an external broadcast managing entity via a broadcast channel. The broadcast channel may include a satellite channel or a terrestrial channel. The broadcast managing entity may be a system which transmits a broadcast signal or broadcast associated information.

Examples of broadcast associated information include information associated with a broadcast channel, a broadcast program, or a broadcast service provider. For example, broadcast associated information may include an electronic program guide (EPG) of digital multimedia broadcasting (DMB) or electronic service guide (ESG) of digital video broadcast-handheld (DVB-H).

The broadcast signal may be implemented as a TV broadcast signal, a radio broadcast signal, or a data broadcast signal. The broadcast signal may further include a broadcast signal combined with a TV or radio broadcast signal.

The broadcast receiving module 111 may receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T).

The broadcast receiving module may also receive multicast signals. Data received by the broadcast receiving module 111 may be stored in a suitable device, such as memory 160.

The mobile communication module 112 transmits and receives wireless signals to and from one or more network entities, such as a base station or a Node-B. The wireless signals may represent audio, video, multimedia, control signaling, or data.

The wireless Internet module 113 provides Internet access for the terminal. The wireless Internet module 113 may be internally or externally coupled to the terminal 100. Suitable technologies for wireless Internet may include, but are not limited to, WLAN (Wireless LAN)(Wi-Fi), Wibro (Wireless broadband), Wimax (World Interoperability for Microwave Access), and HSDPA(High Speed Downlink Packet Access). The wireless Internet module can be replaced with a wire Internet module in non-mobile terminals. The wireless Internet module 113 and wired Internet module may be commonly referred to as an Internet module.

The short-range communication module 114 facilitates short-range communications. Suitable technologies for implementing this module include radio frequency identification (RFID), infrared data association (IrDA), ultra-wideband (UWB), as well as the networking technologies commonly referred to as Bluetooth™ and ZigBee™. The position-location module 115 identifies and obtains the location of the terminal 100. The position-location module 115 may be implemented using global positioning system (GPS) components which cooperate with associated satellites and network components.

The audio/video (A/V) input unit 120 provides audio or video signal input to the terminal 100. The A/V input unit 120 may include a camera 121 and a microphone 122. The camera 121 receives and processes image frames of still pictures or video.

The microphone 122 receives an external audio signal while the portable device is in a particular mode, such as a phone call mode, a recording mode, or a voice recognition mode. The audio signal is processed and converted into digital data. The terminal 100 and A/V input unit 120 may include assorted noise removing algorithms to remove noise generated in the course of receiving the external audio signal.

Data generated by the A/V input unit 120 may be stored in the memory 160, utilized by the output unit 150, or transmitted via one or more modules of communication unit 110. The terminal 100 may include two or more microphones and cameras.

The user input unit 130 generates input data in response to user manipulation of an associated input device or devices. Examples of such devices include a keypad, a dome switch, a touchpad, a jog wheel, and a jog switch.

The sensing unit 140 provides status measurements for various aspects of the terminal 100. For example, the sensing unit may detect an open and closed state of the terminal 100, relative positioning of components of the terminal, a change of position of the terminal, a change of position of a component of the terminal, a presence or absence of user contact with the terminal, orientation of the terminal, or acceleration or deceleration of the terminal. The sensing unit 140 may also sense the presence or absence of power provided by the power supply 190 and the presence or absence of a connection between the interface unit 170 and an external device.

The interface unit 170 may be implemented to connect the terminal with an external device. External devices include wired or wireless headphones, external chargers, power supplies, storage devices configured to store data, or microphones. The interface unit 170 may be configured using a wired and wireless data port, audio input/output (I/O) ports, or video (I/O) ports. The interface unit 170 may also include a card socket for connecting various cards, such as a memory card, a subscriber identity module (SIM) card, a user identity module (UIM) card, or a replaceable user identity module (RUIM) card.

The output unit 150 outputs information associated with the terminal 100. The display 151 is typically implemented to display information associated with the terminal 100. For example, the display 151 may provide a graphical user interface which includes information associated with a phone call if the terminal is operating in a phone call mode. The display 151 may display images which are associated with various modes, such as a video call mode or a photographing mode.

The display 151 may be configured as a touch screen working in cooperation with the input unit 130, in one embodiment of the present invention. This configuration allows the display 151 to function both as an output device and an input device.

The display 151 may be implemented using known display technologies such as a liquid crystal display (LCD), a thin film transistor-liquid crystal display (TFT-LCD), an organic light-emitting diode display (OLED), a flexible display, or a three-dimensional display. The terminal 100 may include one or more of such displays. An example of a two-display embodiment is one in which one display 151 is configured as an internal display which is viewable when the terminal is in an opened position and a second display 151 configured as an external display which is viewable in both the open and closed positions.

The touchscreen may be configured to detect a touch input pressure in addition to a touch input position and a touch input area.

FIG. 1 further shows the output unit 150 having an audio output module 152. The audio output module 152 may be implemented using one or more speakers, buzzers, or other audio producing devices.

The audio output module 152 functions in various modes including a call-receiving mode, a call-placing mode, a recording mode, a voice recognition mode, or a broadcast reception mode. The audio output module 152 outputs audio related to a particular function, such as a call notification, a message notification, or an error notification.

The output unit 150 is further illustrated having an alarm module 153, which may be used to identify the occurrence of an event associated with the mobile terminal 100. An example of such output includes providing a vibration as a notification to a user.

The alarm module 153 may vibrate when the terminal 100 receives a call or message. Vibration may also be provided by the alarm module 153 in response to receiving user input at the terminal 100, thereby providing a tactile feedback mechanism. It is understood that the various outputs provided by the components of output unit 150 may be performed separately or performed using any combination of the components.

A memory 160 may store various types of data to support the processing, control, and storage requirements of the mobile terminal 100. Examples of such data include program instructions for applications operating on the mobile terminal 100, contact data, phonebook data, messages, pictures, and video.

The memory 160 may be implemented using any type of volatile and non-volatile memory or storage devices. Such devices may include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 controls the overall operations of the terminal. For example, the controller 180 performs the control and processing associated with voice calls, data communications, video calls, camera operations, and recording operations.

The controller may include a multimedia module 181 which provides multimedia playback. The multimedia module 181 may be configured as part of the controller 180 or may be implemented as a separate component.

The power supply 190 provides power to the various components of the terminal 100. The power provided may be internal power or external power.

Various embodiments described herein may be implemented in a computer-readable medium using computer software. The various embodiments may also be implemented in hardware.

A hardware implementation may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. Some embodiments are implemented by controller 180.

A software implementation of the embodiments described herein may be implemented with separate software modules, such as procedures and functions, each of which perform one or more of the functions and operations described herein. The software code may be implemented with a software application written in any suitable programming language and may be stored in the memory 160 for execution by the controller 180 or a processor.

The mobile terminal 100 may be implemented in a variety of different configurations. Examples of such configurations include folder-type, slide-type, bar-type, rotational-type, and swing-type.

For clarity, further disclosure will primarily relate to a slide-type mobile terminal 100. However such teachings apply equally to other types of mobile terminals 100.

Figure 2:
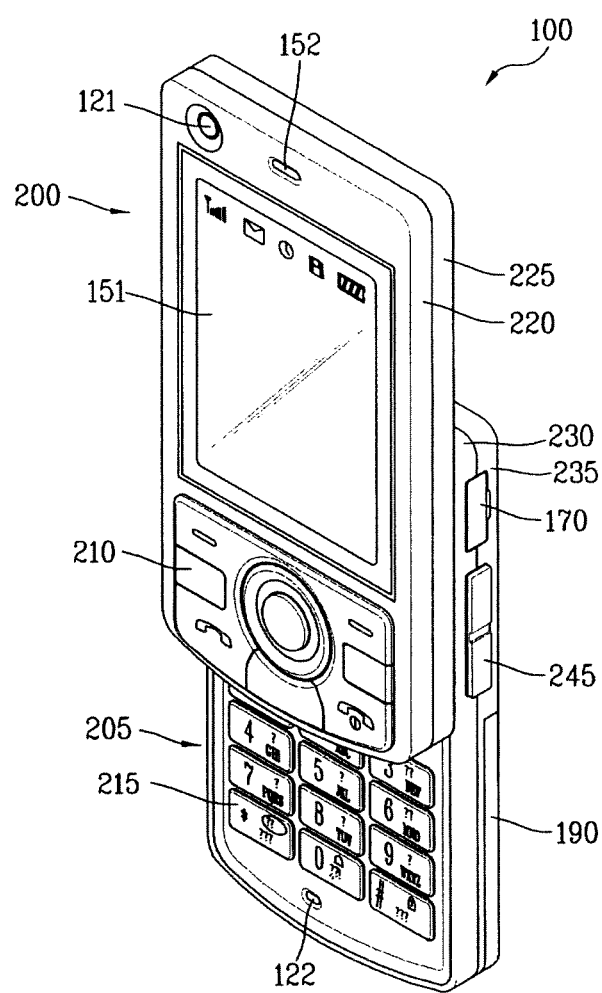
FIG. 2 illustrates a perspective view of a front side of a mobile terminal according to an embodiment of the present invention.

FIG. 2 is a perspective view of a front side of a mobile terminal 100 according to an embodiment of the present invention. As illustrated in FIG. 2, the mobile terminal 100 is shown having a first body 200 configured to slidably cooperate with a second body 205.

The user input unit 130 described in FIG. 1 may include a first input unit such as function keys and four directional keys 210, a second input unit such as keypad 215 and a third input unit such as side keys 245. The function keys 210 are associated with the first body 200, and the keypad 215 is associated with the second body 205. The keypad may include various keys such as numbers, characters, and symbols to enable a user to place a call, prepare a text or multimedia message, and otherwise operate the mobile terminal 100.

The first body 200 slides relative to the second body 205 between open and closed positions. Although not shown in drawings, in a folder-type mobile terminal, a first body thereof folds and unfolds relative to a second body thereof between open and closed positions. In addition, in a swing-type mobile terminal, a first body thereof swings relative to a second body thereof between open and closed positions.

The first body 200 is positioned over the second body 205 in the closed position such that the keypad 215 is substantially or completely obscured by the first body. The user may access the keypad 215, the display 151, and function keys 210 in the open position. The function keys 210 may be configured for a user to enter commands such as 'start', 'stop', or 'scroll'.

The mobile terminal 100 is operable in either a standby mode or an active call mode. Typically, the terminal 100 functions in the standby mode when in the closed position and in the active mode when in the open position. The mode configuration may be changed as required or desired by the user.

The first body 200 is formed from a first case 220 and a second case 225 and the second body 205 is formed from a first case 230 and a second case 235. The respective first and second cases may be formed from a suitably rigid material, such as injection molded plastic, or formed using metallic material, such as stainless steel (STS) and titanium (Ti).

One or more intermediate cases may be provided between the first case 220 and second case 225 of the first body 200 or between the first case 230 and second case 235 the second body 205. The first body 200 and the second body 205 may be sized to house electronic components necessary to support operation of the mobile terminal 100.

The first body 200 is illustrated having a camera 121 and audio output module 152. The camera 121 may be selectively positioned such that the camera may rotate or swivel relative to the first body 200.

The function keys 210 are positioned adjacent to a lower side of the display 151. The display 151 is implemented as an LCD. The display 151 may also be configured as a touchscreen having an underlying touchpad which generates signals responsive to user contact with the touchscreen.

The second body 205 is illustrated having a microphone 122 positioned adjacent to the keypad 215 and side keys 245 positioned along the side. The side keys 245 may be configured as hot keys, such that the side keys are associated with a particular function of the terminal 100.

An interface unit 170 is illustrated positioned adjacent to the side keys 245. A power supply 190 in a form of a battery is located on a lower portion of the second body 205.

Figure 3:
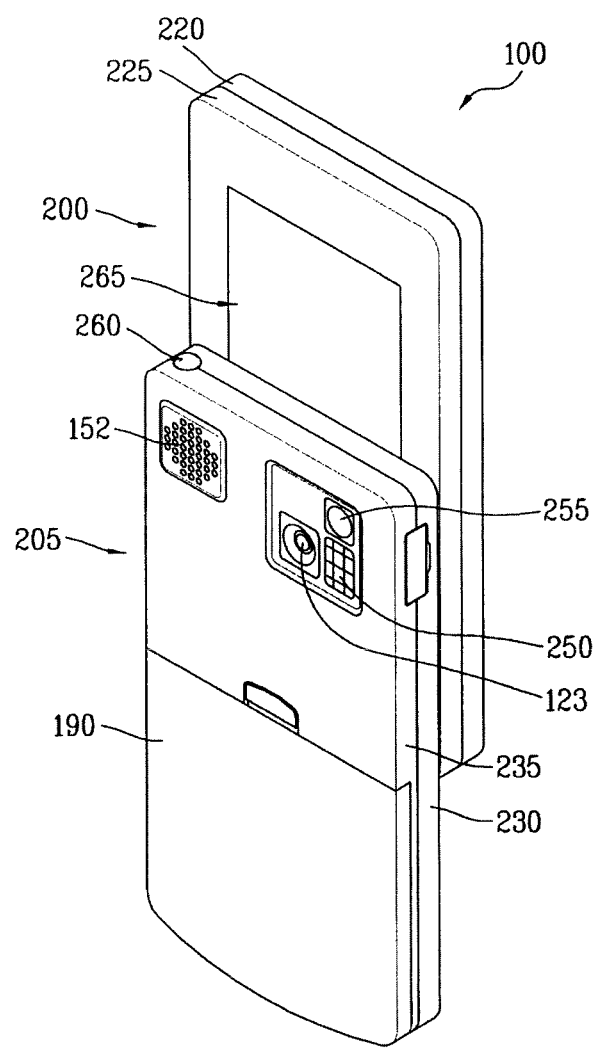
FIG. 3 illustrates a rear view of the mobile terminal shown in FIG. 2.

FIG. 3 is a rear view of the mobile terminal 100 shown in FIG. 2. As illustrated in FIG. 3, the second body 205 includes a camera 123, a flash 250, and a mirror 255.

The flash 250 operates in conjunction with the camera 123. The mirror 255 is useful for assisting a user to position the camera 123 in a self-portrait mode.

The camera 123 of the second body 205 faces a direction opposite to a direction faced by camera 121 of the first body 200. The camera 121 of the first body 200 and camera 123 of the second body 205 may have the same or different capabilities.

In one embodiment, the camera 121 of the first body 200 operates with a relatively lower resolution than the camera 123 of the second body 205. Such an arrangement works well during a video conference in which reverse link bandwidth capabilities may be limited. The relatively higher resolution of the camera 123 of the second body 205 is useful for obtaining higher quality pictures.

The second body 205 also includes an audio output module 153 configured as a speaker which is located on an upper side of the second body. The audio output module 152 of the first body 200 and the audio output module 153 of the second body 205 may cooperate to provide stereo output. Moreover, either or both of the audio output modules 152 and 153 may be configured to operate as a speakerphone.

A broadcast signal receiving antenna 260 is located at an upper end of the second body 205. The antenna 260 functions in cooperation with the broadcast receiving module 111. The antenna 260 may be fixed or configured to retract into the second body 205.

The rear side of the first body 200 includes a slide module 265. The slide module 265 slideably couples with a corresponding slide module (not illustrated) located on the front side of the second body 205.

It is understood that the illustrated arrangement of the various components of the first body 200 and the second body 205 may be modified as desired. Some or all of the components of one body may alternatively be implemented on the other body. In addition, the location and relative positioning of the components are not critical to many embodiments and, therefore, the components may be positioned at locations which differ from those illustrated by the representative figures.

The mobile terminal 100 may operate in a communication system capable of transmitting data via frames or packets. The communication system may include wired communication, wireless communication, or a satellite-based communication system.

The communication system may utilize various systems such as frequency division multiple access (FDMA), time division multiple access (TDMA), code division multiple access (CDMA), universal mobile telecommunications system (UMTS), long term evolution (LTE) of the UMTS, or the global system for mobile communications (GSM). By way of non-limiting example, further description will relate to a CDMA communication system, but such teachings apply equally to other system types.

Figure 4:
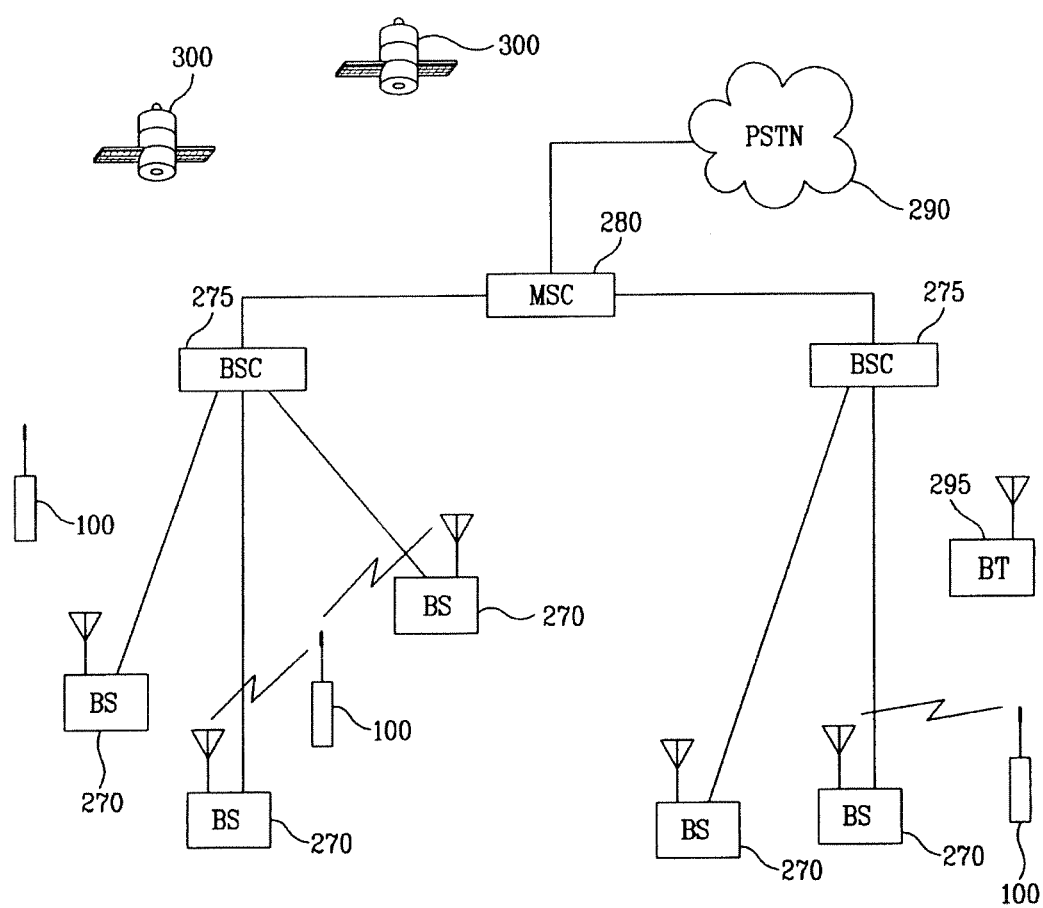
FIG. 4 illustrates a block diagram of a CDMA wireless communication system operable with the mobile terminal of FIGS. 1-3.

As illustrated in FIG. 4, a CDMA wireless communication system is illustrated having a plurality of terminals 100, a plurality of base stations (BS) 270, base station controllers (BSC) 275, and a mobile switching center (MSC) 280. The MSC 280 is configured to interface with a conventional public switch telephone network (PSTN) 290 and is also configured to interface with the BSCs 275.

The BSCs 275 are coupled to the BSs 270 via backhaul lines. The backhaul lines may be configured in accordance with any of several known interfaces including E1/T1, ATM, IP, PPP, Frame Relay, HDSL, ADSL, or XDSL. It is to be understood that the system may include more than two BSCs 275.

Each BS 270 may include one or more sectors, each sector having an omnidirectional antenna or an antenna pointed in a particular direction radially away from the BS 270. Each sector may include two antennas for diversity reception. Each BS 270 may be configured to support a plurality of frequency assignments, with each frequency assignment having a particular spectrum.

The intersection of a sector and frequency assignment may be referred to as a CDMA channel. The BSs 270 may also be referred to as base station transceiver subsystems (BTSs). In an alternate embodiment, the term "base station" may be used to refer collectively to a BSC 275 and one or more BSs 270.

The BSs 270 may also be denoted "cell sites." Alternatively, individual sectors of a given BS 270 may be referred to as cell sites.

A broadcasting transmitter (BT) 295 is illustrated broadcasting to mobile terminals 100 operating within the system. The broadcast receiving module 111 of the mobile terminal 100 is configured to receive broadcast signals transmitted by the BT 295. Similar arrangements may be implemented for other types of broadcast and multicast signaling.

FIG. 4 also shows several global positioning system (GPS) satellites 300. The GPS satellites 300 facilitate locating the position of some or all of the terminals 100. The position-location module 115 of the mobile terminal 100 is typically configured to cooperate with the satellites 300 to obtain position information.

Other types of position detection technology may be used in addition to or instead of GPS location technology. Some or all of the GPS satellites 300 may alternatively or additionally be configured to provide satellite DMB transmissions.

The BSs 270 receive sets of reverse-link signals from various terminals 100 during operation of the wireless communication system. The terminals 100 are performing calls, messaging, or other communications.

Each reverse-link signal received by a BS 270 is processed within that BS. The resulting data is forwarded to an associated BSC 275. The BSC 275 provides call resource allocation and mobility management functionality including soft handoffs between base stations 270. The BSCs 275 also route the received data to the MSC 280, which provides additional routing services for interfacing with the PSTN 290. Similarly, the PSTN 290 interfaces with the MSC 280 and the MSC interfaces with the BSC 275, which in turn control the BSs 270 to transmit sets of forward-link signals to the terminals 100.

In the following description, a control method applicable to the above-configured mobile terminal 100 is explained with respect to various embodiments. It is understood that the following embodiments can be implemented independently or through combinations thereof.

A proximity-touch may be defined as when a pointer does not touch the touch screen. In the specification, the pointer may be a tool for touching or proximity-touching a specific point on the display screen.

Additionally, a touch or real-touch may be defined as when the pointer touches/contacts the touch screen. In this example, the controller 180 may recognize the touch as a predetermined input signal.

The mobile terminal 100 according to one embodiment of the present invention may sense the proximity-touch or the touch via a sensing unit 140. The sensing unit 140 may include various sensors for performing various sensing functions. For example, the sensing unit 140 may include a proximity sensor or a tactile sensor. The proximity sensor may detect the presence or absence of objects approaching a detection surface or objects existing near the detection surface using electromagnetic force or infrared rays without a mechanical contact. Additionally, the proximity sensor does not output an ON/OFF output via the mechanical contact, rather outputs the ON/OFF output if a sensing object is entered within the sense region defined by the sensor. Therefore, the proximity switch may have a greater lifespan as compared to the touch switch.

The operating principle of the proximity-switch attenuates or stops oscillation amplitude of an oscillation circuit if the sensing object approaches the sensing surface of the sensor during oscillation of sinusoidal high frequency in the oscillation circuit and converts such a change into an electrical signal, thereby detecting the presence or absence of the sensing object. Therefore, any materials placed between the high frequency oscillating proximity sensor and the sensing object will not disrupt the detection of the sensing object. Additionally, the tactile sensor may include a sensor that senses a touch with a specific object beyond the range of normal human touch. The tactile sensor may sense a variety of information, such as the roughness of the touch surface, the hardness of the touch object, or the temperature of the touch point.

The sensing unit 140 can also sense a proximity-distance or a proximity speed. The proximity-distance may include a spaced distance between the touch screen and the pointer. Additionally, the proximity speed may include a speed of the pointer approaching the touch screen or the pointer moving away from the touch screen.

Finally, the sensing unit 140 may sense a drag or a proximity-drag. The sensing unit 140 may sense a drag direction, a drag speed, or a drag-length of the drag or the proximity-drag. The drag may be defined as when touch is dragged. The proximity-drag may be defined as when the proximity-touched point is dragged. Furthermore, proximately touching a point on the touch screen may be defined as recognizing the pointer positioned at a position vertically corresponding to the point.

Hereinafter, the mobile terminal 100 including a touch screen will be described by way of example. The mobile terminal 100 according to one embodiment of the present invention may control a display on the touch screen according to the relation of the real-touch and the proximity-touch.

Hereinafter, a control method of the touch screen will be described in detail according on the relation of the real-touch and the proximity-touch with reference to the drawings.

Figure 5:
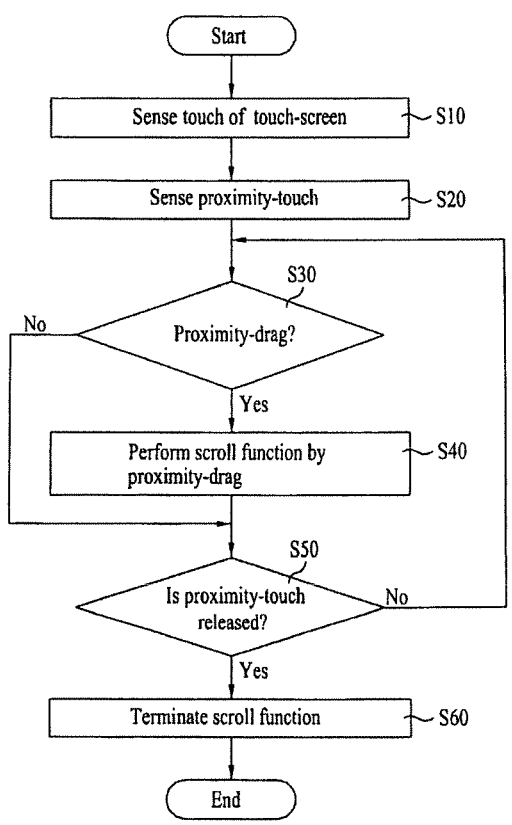
FIG. 5 illustrates a flow chart for a scroll method of a mobile terminal according to one embodiment of the present invention.

FIG. 5 is a flow chart for a method of performing a scroll function of the touch screen of the mobile terminal according to one embodiment of the present invention.

The sensing unit 140 may sense a real-touch on a display 151 (S10). The sensing unit 140 senses the touch if the pointer is touched on a region of the display 151. After sensing the real-touch, the sensing unit 140 may sense a proximity-touch (S20). If the sensing unit 140 determines the presence of a proximity-touch, the user may perform a proximity drag (S30). When the proximity-drag is performed via the pointer, a controller 180 may perform the scroll function according to the proximity-drag (S40). Additionally, the sensing unit 140 may determine if the proximity-touch has been released (S50). If the proximity-touch is released, the controller 180 may terminate the scroll function.

The controller 180 may control a scroll direction according to a direction of the proximity-drag. For example, if the drag direction is "down", the scroll is performed in the down direction. If the drag direction is "up", the scroll is performed in the up direction.

Additionally, the controller 180 may control the scroll speed according to the characteristics of the proximity-drag length. For example, the scroll speed may be adjusted according to the length of the proximity-drag. Furthermore, the controller may control the scroll speed according to the proximity-drag direction. For example, when the proximity-drag is moved in a first direction and is then moved in the opposite direction, the controller 180 may reduce the scroll speed of the first direction. Additionally, the controller 180 may completely terminate the scrolling if the proximity-drag is moved in the opposite direction from the first direction.

As opposed to terminating the scroll as discussed above, the controller 180 may terminate the scroll function performed by the proximity-drag if the pointer is positioned at a position out of a recognizable range of the sensing unit 140 (S50, S60).

Figure 6:
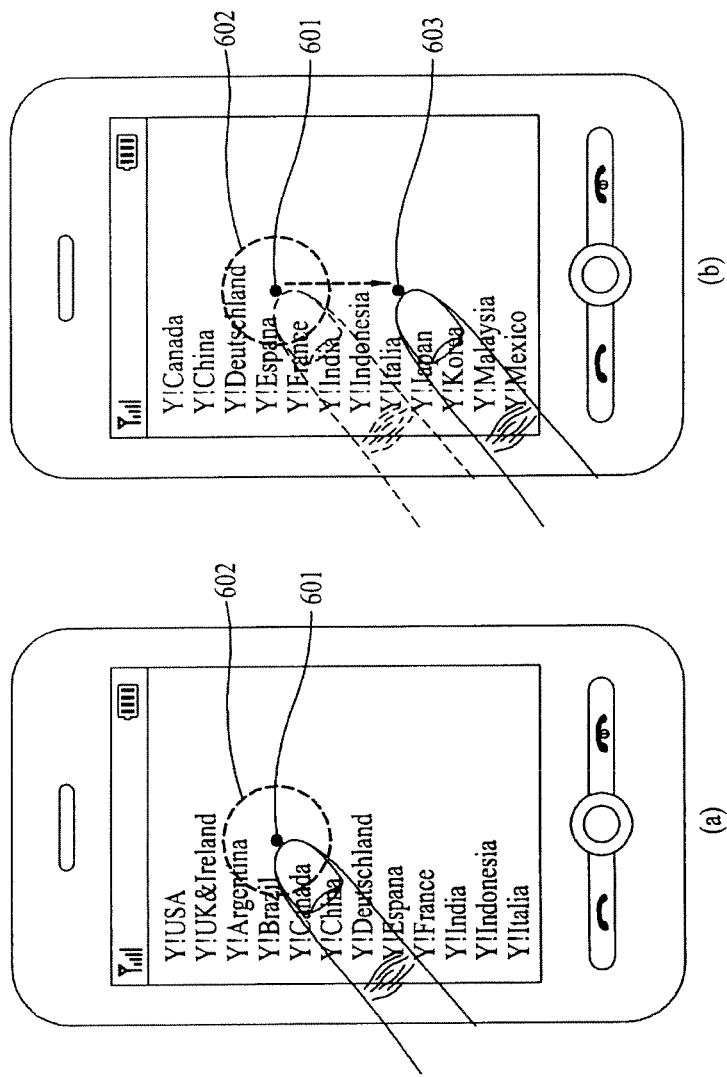
FIGS. 6-10 illustrate a mobile terminal according to the method of FIG. 5.

FIG. 6 illustrates an example of a proximity drag according to the method of FIG. 5.

As illustrated in FIG. 6a, a point 601 on the touch screen may be touched by a pointer, such as a finger. To prevent a false positive, the controller 180 may not perform a proximity-drag if the sensing unit 140 senses a proximity-touch within the touch region 602 after sensing the touch at point 601.

However, as illustrated in FIG. 6b, the controller 180 may perform the scroll function if the touch screen is proximity-touched on a second point 603 which is out of the range of the touch region 602. As illustrated in FIG. 6b, if the proximity-drag direction is down, then the scroll function may be performed in the down direction.

Additionally, in some instances the touch region 602 may be disabled.

Figure 7:
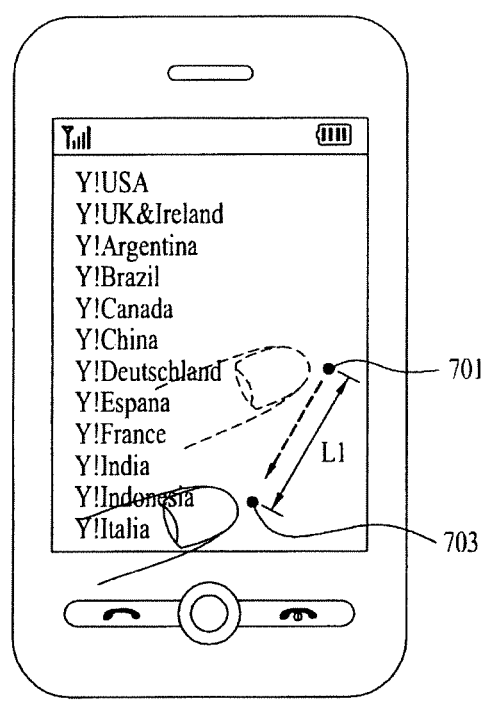

FIG. 7 illustrates an example of the method shown in FIG. 5.

The controller 180 may control a scroll angle or a scroll speed according to the proximately-dragged distance or direction. After a first point 701 on the touch screen is touched, the proximity-drag may be performed from the first point 701 to a second point 703. The proximity-drag direction is a downward left direction and the proximate-drag length is L1. Thus, the controller 180 may perform the scroll function in the left downward direction. Additionally, the controller 180 may control the scroll speed according to the drag length L1. The controller 180 may increase the scroll speed rapidly as the proximate-drag length increases.

Figure 8:
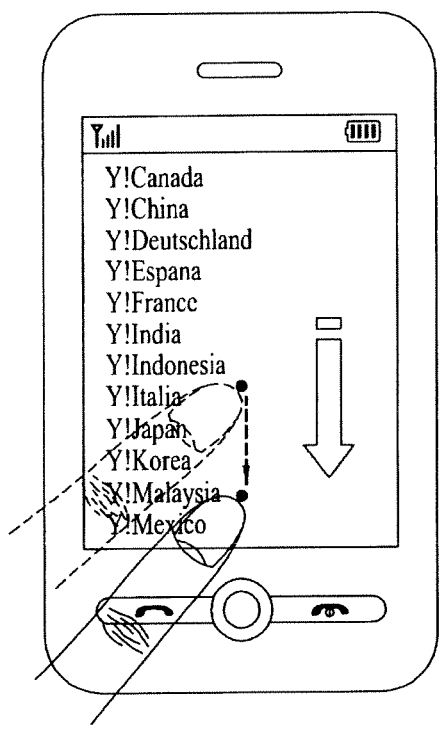

FIG. 8 illustrates another example of performing the method shown in FIG. 5.

The controller 180 may perform the scroll function if the proximity-drag is performed from a first point to a second point after the first point on the touch screen is touched.

The controller 180 may perform the scroll function in an arrow direction as long as the pointer, such as a finger, maintains the proximity-touch position at the second point. The controller 180 terminates the scroll function when the pointer is released from the proximity-touch position at the second point.

Figure 9:
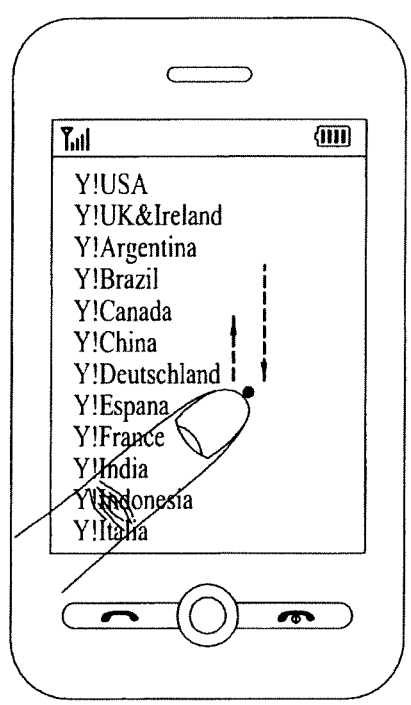

FIG. 9 illustrates another example of performing the method shown in FIG. 5.

As illustrated in FIG. 9, the controller 180 may control the scroll speed according to the direction of the proximity-drag. The controller 180 may perform the scroll function when the proximity-drag is performed from the first point to the second point after the first point on the touch screen is touched. For example, as illustrated in FIG. 9, the scroll function may be in a downward direction. While the controller 180 is scrolling, if the proximity-drag is performed in an opposite direction, such as up, the controller 180 may slowly reduce the scroll speed performed in the downward direction. The controller 180 may slowly stop the progressed scroll speed using acceleration in an opposite direction than the direction in which the scroll is progressed.

Figure 10:
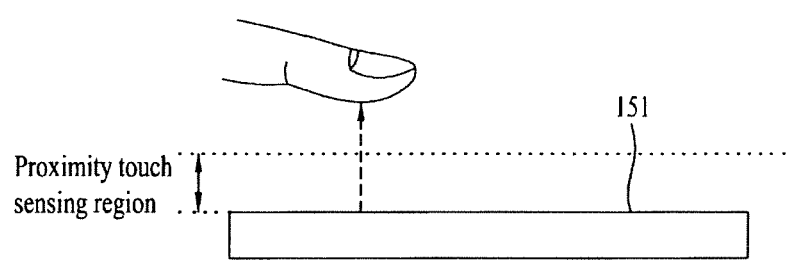

Additionally, the scroll function illustrated in FIGS. 6-9 may be terminated if the proximity-touch is released. FIG. 10 illustrates an example of releasing the proximity-touch.

As illustrated in FIG. 10, the sensing unit 140 preferably senses a proximity-touch that is within the "Proximity touch sensing region." The proximity touch sensing region is a predetermined distance from the display 151. When the pointer, such as a finger, is positioned out of the proximity touch sensing region, the sensing unit 140 cannot sense the pointer. As discussed above, the controller 180 may terminate the scroll function when the proximity-touch is outside of the proximity touch sensing region.

Figure 11:
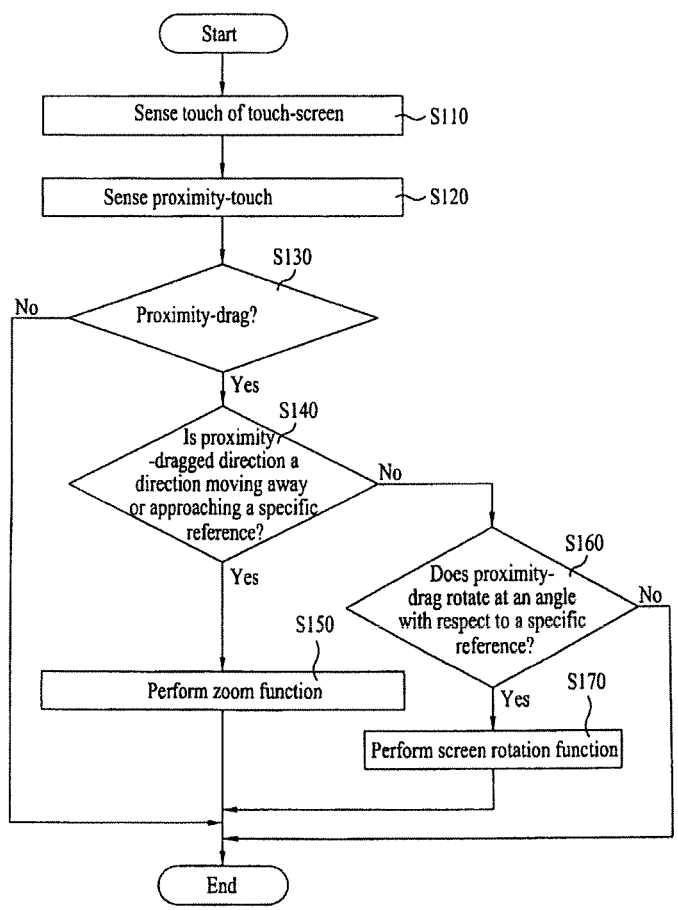
FIG. 11 illustrates a flow chart for a zoom and rotation method of the touch screen according to one embodiment of the present invention.

FIG. 11 illustrates a flow chart for a zoom method of the touch screen of the mobile terminal according to one embodiment of the present invention. The zoom function is associated with a means for screen expansion or screen reduction. A zoom-in function expands the display and the zoom-out function reduces the display.

The sensing unit 140 may sense the real-touch on the display 151 (S110). After the real-touch, the sensing unit 140 may sense the proximity-touch (S120). Once the proximity-touch has been detected, the proximity-drag may be performed (S130). The controller 180 may control the zoom according to the proximity-drag direction. The controller may zoom the display if the proximity-drag is in a direction moving away or approaching a specific reference (S140, S150).

Additionally, the controller 180 may control the rotation according to the proximity-drag angle. The controller may rotate the display if the proximity-drag is in an rotation angle (S160, S170).

For example, the controller 180 may zoom-in if the proximity-drag is moving away from the specific reference and may zoom-out if the proximity-drag approaches the specific reference. Additionally, the controller 180 may control the zoom function according to the length of the proximate-drag.

Furthermore, the controller 180 may perform the rotation function of the touch screen (S170). For example, the controller 180 may rotate the touch screen by 30° clockwise when the proximity-dragged point is rotated by 30° clockwise in relation to a reference point.

Additionally, the rotated angle of the touch screen may be different from the rotating angle of the proximity-drag. For example, the controller 180 may rotate the touch screen by 15° clockwise when the proximity-dragged point is rotated 30° clockwise in relation to a reference point.

Furthermore, when the pointer is positioned out of the proximity touch sensing range of the sensing unit 140 for a predetermined time, the zoom function or the rotation function of the touch screen may be terminated. Additionally, in order to prevent false positives, the controller 180 may not perform the zoom or rotation if the proximity-drag is equal to or less than a predetermined distance.

Figure 12:
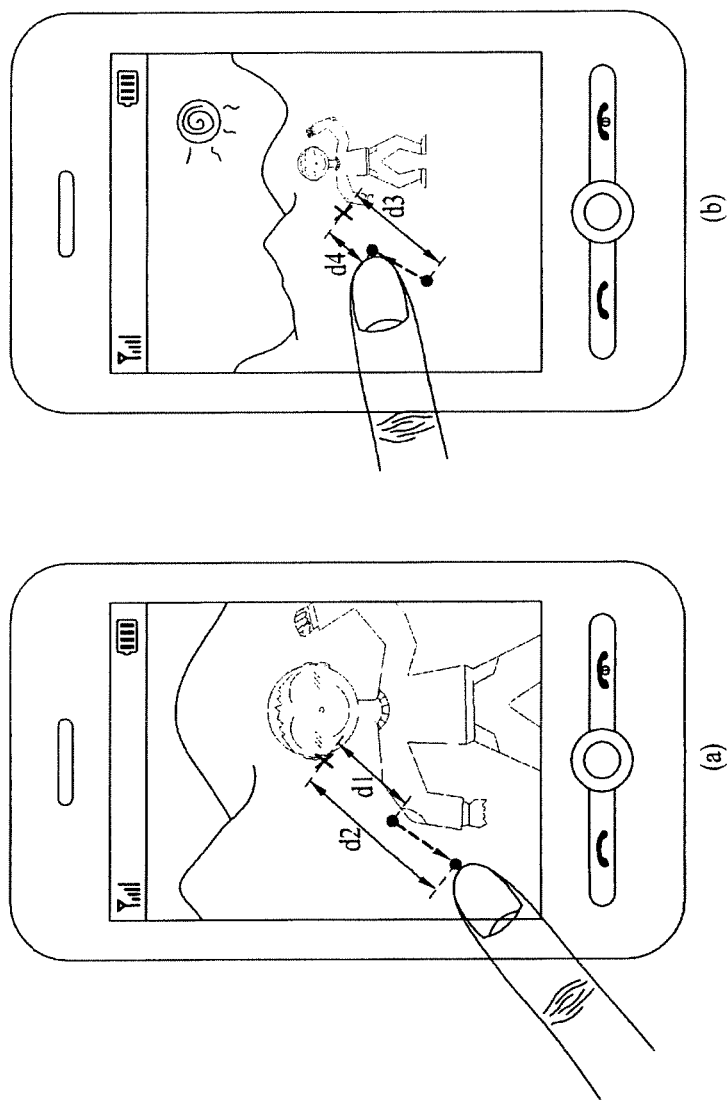
FIGS. 12-13 illustrate the touch screen according to the method of FIG. 11.

FIG. 12 illustrates an example of the zoom method of the touch screen of the mobile terminal according to FIG. 11.

FIG. 12a illustrates an example where the touch screen is expanded via the proximity-drag. After a predetermined point on the touch screen is touched with the pointer, such as a finger, if the proximity-drag moves away from the center of the touch screen, the controller 180 may zoom-in on the touch screen. The controller may determine zoom-in magnification based on a distance (d1) from the center of the touch screen to the predetermined point and a distance (d2) from the center of the touch screen to the proximity-drag position. For example, zoom-in magnification level may equal the result of "d2" divided by "d1" (d2/d1).

FIG. 12b illustrates an example of reducing the touch screen via the proximity-drag. After a predetermined point on the touch screen is touched with a pointer, such as a finger, if the proximity-drag is performed in a direction towards the center of the touch screen, the controller 180 may zoom-out on the touch screen. The controller may determine the zoom-out level according to a distance (d3) from the center of the touch screen to the predetermined point and a distance (d4) from the center of the touch screen to the proximity-dragged position. For example, the zoom-out level may equal the result of "d4" divided by "d3" (d4/d3).

Additionally, in order to avoid false positives, the controller 180 may not perform the zoom function if the proximity-drag performed is within the predetermined region.

Figure 13:
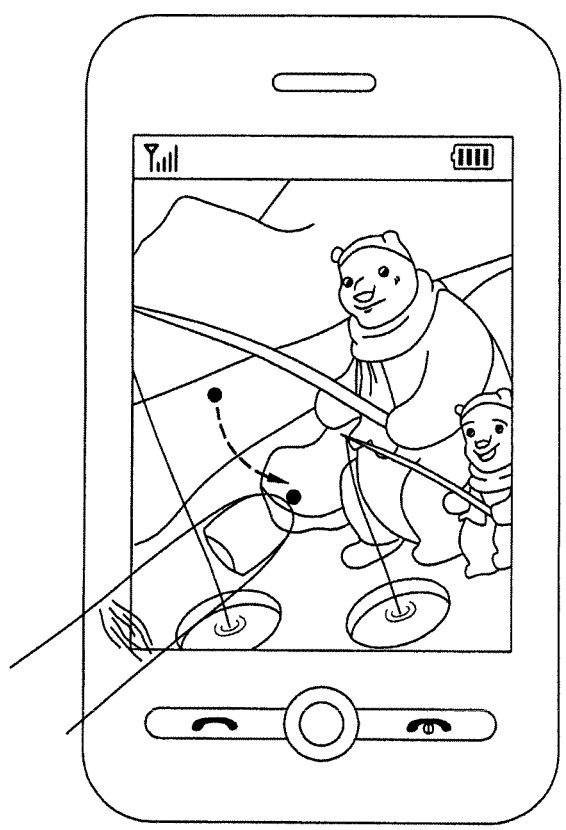

FIG. 13 illustrates an example of the rotation method of the touch screen according to FIG. 11.

As illustrated in FIG. 13, after a predetermined point on the touch screen is touched with a pointer, such as a finger, if the proximity-drag is performed in an angled in reference to the center of the touch screen, the controller 180 may rotate the touch screen. The controller 180 rotates the touch screen according to the angle and direction rotated via the proximity-drag. For example, the controller 180 may rotate the touch screen by 30° counterclockwise when the proximity-drag point is rotated and moved 30° in reference to the center of the touch screen.

Additionally, in order to avoid false positives, the controller 180 may not perform the rotation function if the proximity-drag performed is within the predetermined region.

Figure 14:
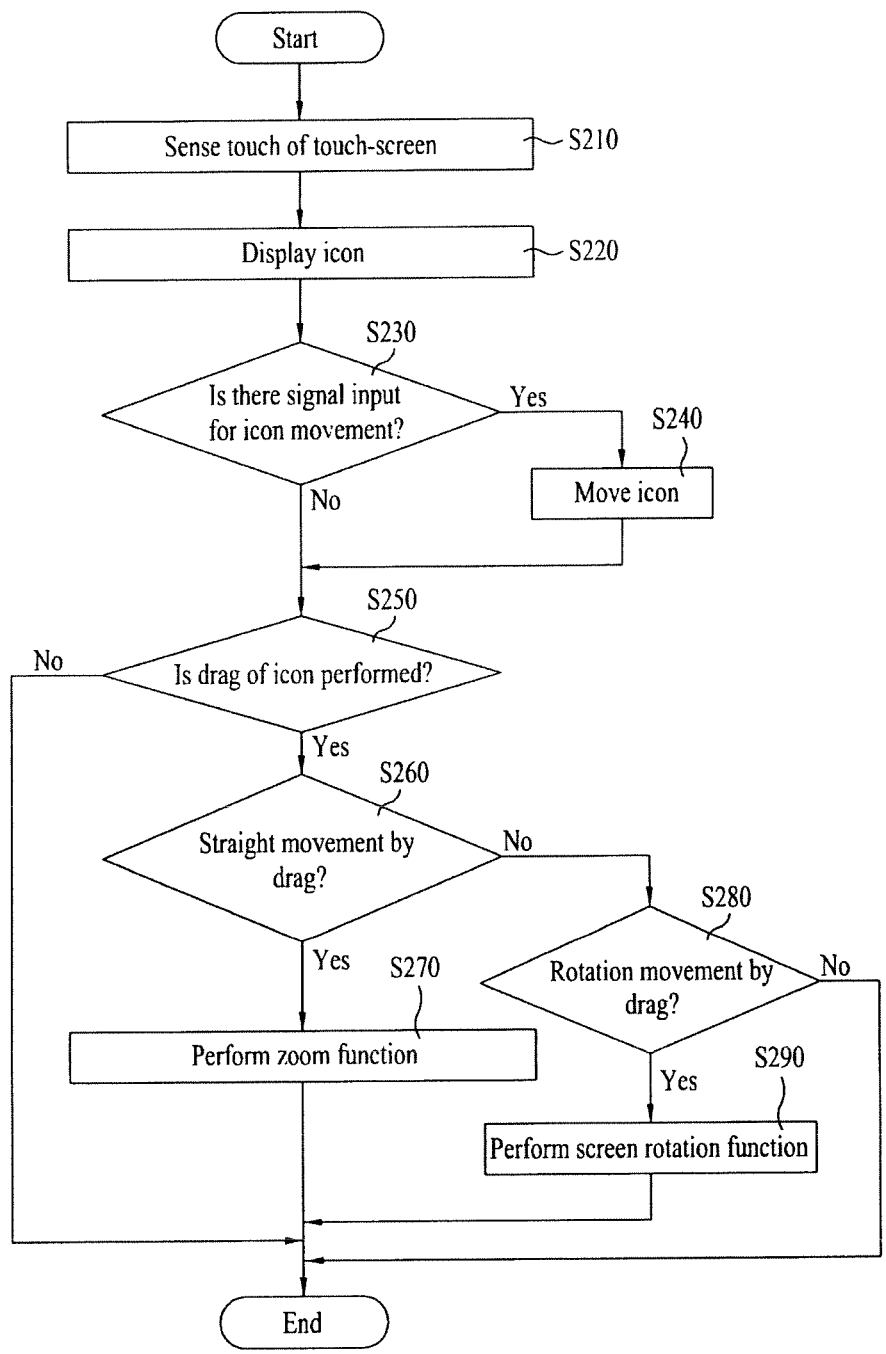
FIG. 14 illustrates a flow chart for a zoom and rotation method of the touch screen according to one embodiment of the present invention.

FIG. 14 illustrates a flow chart for a zoom and rotation method of the touch screen of the mobile terminal based on the relation of the touch and the proximity-touch according to one embodiment of the present invention. The sensing unit 140 senses the proximity-touch at the predetermined point of the display 151 and the controller 180 displays a specific icon for performing the zoom function or the rotation function (S210, S220). A user may activate the zoom function or the rotation function of the touch screen via the specific icon. The specific icon may be displayed on the proximity-touched point. For example, the controller 180 may display an animation on the touch screen before displaying the specific icon so as to inform the user of the proximity-touched point.

The controller 180 may move the position of the specific icon by a specific signal input (S230, S240). The controller 180 may perform the zoom function or the rotation function of the touch screen via the movement of the icon.

The controller 180 may perform the zoom function or the rotation function of the touch screen according to the movement of the icon via an actual touch (S260, S270, S280, S290).

The controller 180 may perform the zoom function when the icon is dragged in a straight direction (S250, S260, S270). For example, the controller 180 may perform the zoom-in function if the icon is dragged towards a specific reference and may perform the zoom-out function if the icon is dragged away from the specific reference. Also, the controller 180 may control the zoom levels according to the touch-drag length.

The controller 180 may also the rotate the touch screen when the predetermined point of the icon is dragged at an angle in relation to a reference point (S250, S280, S290). For example, the controller 180 may rotate the touch screen by 90° clockwise if the icon is rotated 90° clockwise in relation to a reference point. Additionally, the rotated angle of the touch screen may differ from the rotating angle of the dragged icon. For example, the controller 180 may rotate the touch screen 15° clockwise if the icon is dragged point 30° clockwise in relation to a reference point.

Additionally, the controller 180 may perform the scroll function of the touch screen while the icon for the zoom and rotation is displayed.

Furthermore, in order to avoid false positives, the controller 180 may not perform the zoom or rotation function if the drag performed is within the predetermined region.

Figure 15:
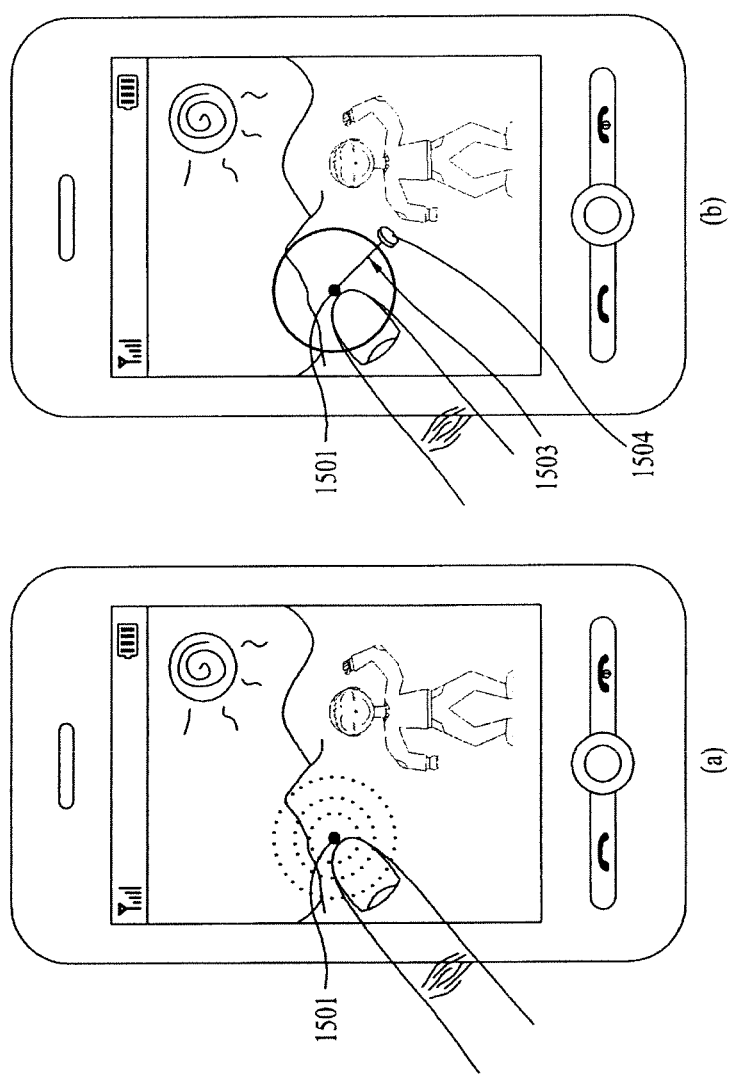
FIG. 15 illustrates the touch screen according to the method of FIG. 14.

FIG. 15 illustrates an example of displaying the icon for performing the zoom function or the rotation function of the touch screen according the method shown in FIG. 14.

As illustrated in FIG. 15, if the proximity-touch is maintained at a predetermined point for a predetermined time, the controller 180 may display an animation. In this example, the controller 180 may output a vibration or a sound together with the animation.

The animation may be used to inform the user that the touch input or the proximity-touch input is activated in the mobile terminal 100. For example, the user may lock the mobile terminal 100 when it is not in use. The signal input function by the touch or the proximity-touch may be deactivated if the mobile terminal 100 is locked. When the mobile terminal 100 is in the inactive state, the controller 180 may display the animation to inform the activation of the touch input or the proximity-touch input when a signal has activated the touch input or the proximity-touch input.

Furthermore, as illustrated in FIG. 15*b*, if the predetermined time is elapsed after the display of the animation, FIG. 15*a*, a pin type icon 1503 may be displayed to guide the zoom function or the rotation function of the touch screen. The controller 180 may perform the zoom function or the rotation function of the touch screen when a head 1504 of the icon 1503 is touch-dragged in relation to a reference point 1501 of the icon 1503. A circle may be displayed around the icon 1503.

Figure 16:
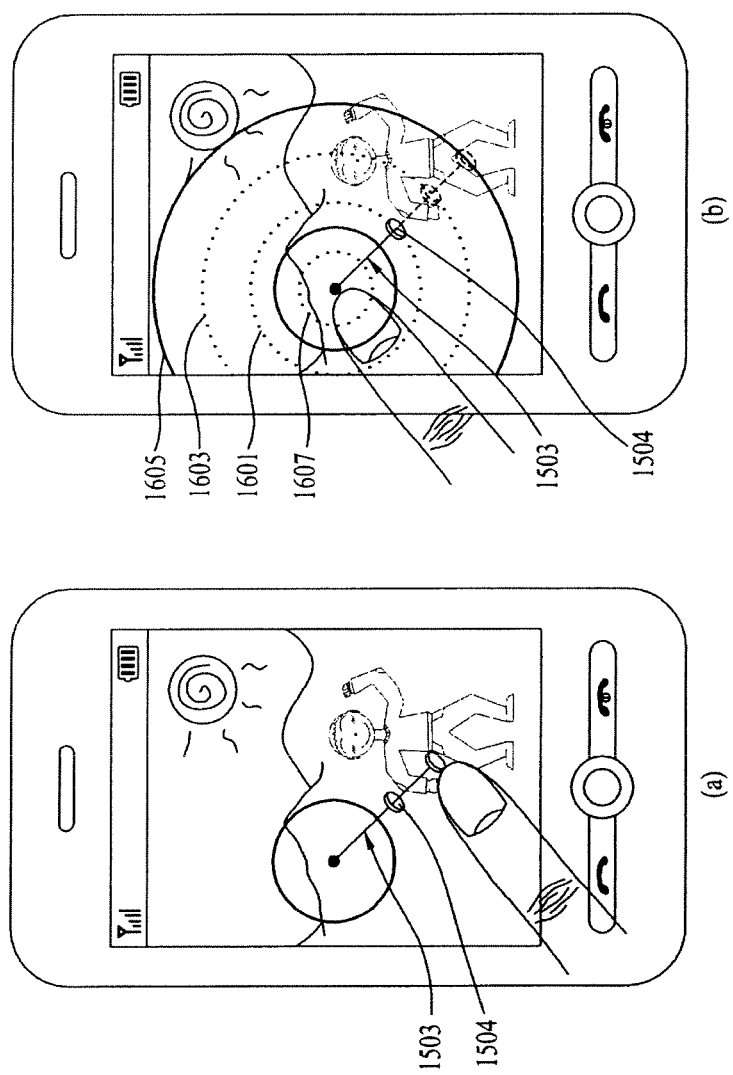
FIG. 16 illustrates an example of the zoom method of the touch screen using an icon in a pin type according to FIG. 15.

FIG. 16 illustrates an example of performing the zoom function of the touch screen using the pin type icon 1503.

FIG. 16*a* illustrates an example of touching and dragging the head 1504 of the icon 1503. The head 1504 of the icon 1503 may be dragged in any direction. The controller 180 may perform the zoom-in function if the head 1504 of the icon 1503 is dragged away from the reference point 1501 and may perform the zoom-out function if the head 1504 of the icon 1503 is dragged towards the reference point 1501.

Additionally, the head 1504 of the icon 1503 may be dragged in a straight line for performing the zoom function. The controller 180 may perform the zoom function if the controller 180 determines that the head 1504 of the icon 1503 has been dragged in a straight line within a predetermined range.

The controller 180 may determine the expansion or reduction level for the zoom function according to the drag length. FIG. 16*b* illustrates an example of determining expansion or reduction level for the zoom function according to the drag length. As illustrated in FIG. 16*b*, circles with various sizes according to a length of a radius may be displayed on the touch screen. If the head 1504 of the icon 1503 is dragged to a circumference of a specific circle, the extension or reduction magnification may be determined according to the length of the radius of the respective.

For example, if an original magnification is indicated when the head 1504 of the icon 1503 is positioned on the circumference of the circle 1601, the controller 180 may perform the zoom function to magnify the original screen when the head 1504 of the icon 1503 is positioned on the circumference of the circle 1603. Furthermore, the controller 180 may even further magnify the original screen when the head 1504 of the icon 1503 is positioned on the circumference of the circle 1605. Additionally, the controller 180 may reduce the original screen if the head 1504 of the icon 1503 is positioned on the circumference of the circle indicated by a reference number 1607.

Additionally, in order to avoid false positives, the controller 180 may not perform the zoom function if the drag is within the predetermined region.

Figure 17:
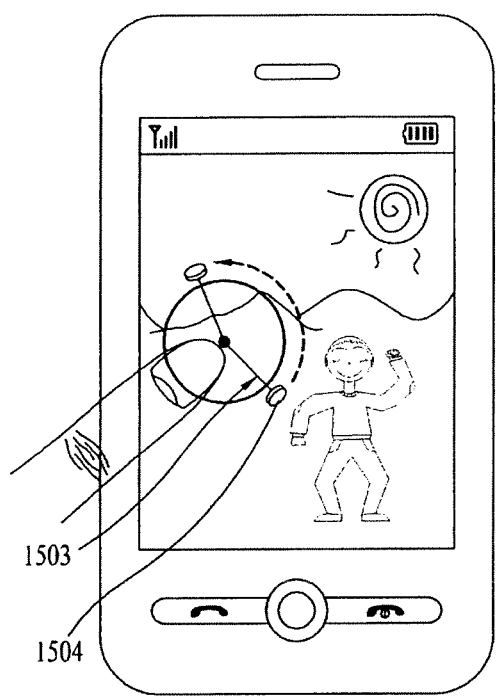
FIG. 17 illustrates an example of the rotation method of the touch screen using the icon in the pin type according to FIG. 15.

FIG. 17 illustrates an example of a method for performing the rotation function of the touch screen using the pin type icon 1503 illustrated in FIG. 15.

As illustrated in FIG. 17, the head 1504 of the icon 1503 may be dragged at an angle in relation to the reference point 1501. The controller 180 may rotate the touch screen when the head 1504 of the icon 1503 is dragged counter clockwise or clockwise in relation to the reference point 1501. The rotation angle and rotation direction of the touch screen may be determined according to the drag direction and angle. For example, the controller 180 may rotate the touch screen 30° counter clockwise when the head 1504 of the icon 1503 is rotated and moved 30° counter clockwise in relation to the reference point 1501.

Additionally, the controller 180 may continuously rotate the touch screen or the controller 180 may rotate the touch screen in intervals. For example, the controller 180 may perform the continuous rotation in proportion to the rotation angle made in relation to the reference point 1501. Furthermore, the controller can perform the rotation according to the interval of the angle. For example, the controller 180 may rotate the touch screen 0° when the rotation angle in relation to the reference point 1501 is 0° to 30°, the controller 180 may rotate the touch screen 30° when the rotation angle is 30° to 60°, and the controller 180 may rotate the touch screen 60° when the rotation angle is 60° to 90°.

Additionally, in order to avoid false positives, the controller 180 may not perform the rotation if the drag is within the predetermined region.

Figure 18:
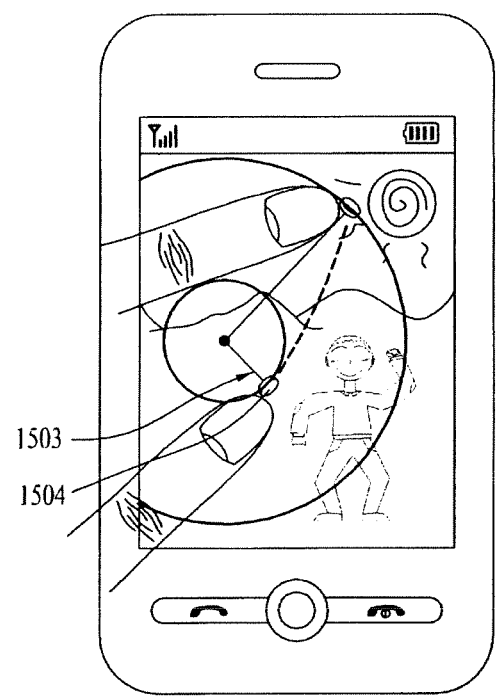
FIG. 18 illustrates an example of the zoom and rotation method of the touch screen using the icon in the pin type according to FIG. 15.

FIG. 18 illustrates an example for simultaneously zooming and rotating the touch screen using the pin type icon 1503 illustrated in FIG. 15.

As illustrated in FIG. 18, the controller 180 may simultaneously rotate and zoom the touch screen when the head 1504 of the icon 1503 is dragged in a direction moving away from the reference point 1501 while simultaneously dragging the head 1504 of the icon 1503 in an angle in relation to the reference point 1501. For example, the controller 180 may magnify the touch screen two times while simultaneously rotating the touch screen by 60° counter clockwise if the rotation angle of the head 1504 of the icon 1503 is 60° and the head 1504 of the icon 1503 moves away from the reference point 1501 by a distance associated with two zoom levels.

Figure 19:
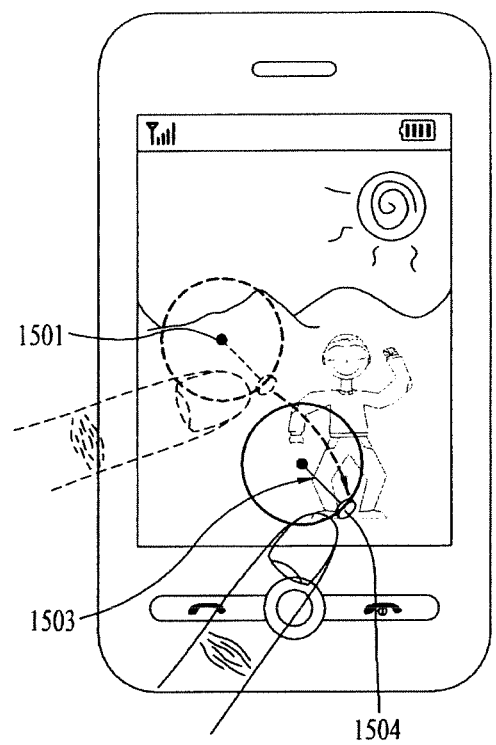
FIG. 19 illustrates an example of moving the icon in the pin type according to FIG. 15.

FIG. 19 illustrates an example of moving the pin type icon 1503 illustrated in FIG. 15.

As illustrated in FIG. 19, the controller 180 may move the icon 1503 to a desired position. For example, when the icon 1503 region is proximity-touched when the icon 1503 is displayed, the color of the icon 1503 may change. In this example, if the icon 1503 is proximity-dragged, the controller 180 may move the position of the icon 1503 according to the proximity-drag. The color of the icon 1503 is restored to the original color when the proximity-touch is released to complete the movement of the icon.

Additionally, the controller 180 may move the position of the icon 1503 via the drag of the reference point 1501. For example, the controller 180 can move the position of the icon 1503 if the reference point 1501 is touched and dragged when the icon 1503 is displayed, based on the touch-drag.

Figure 20:
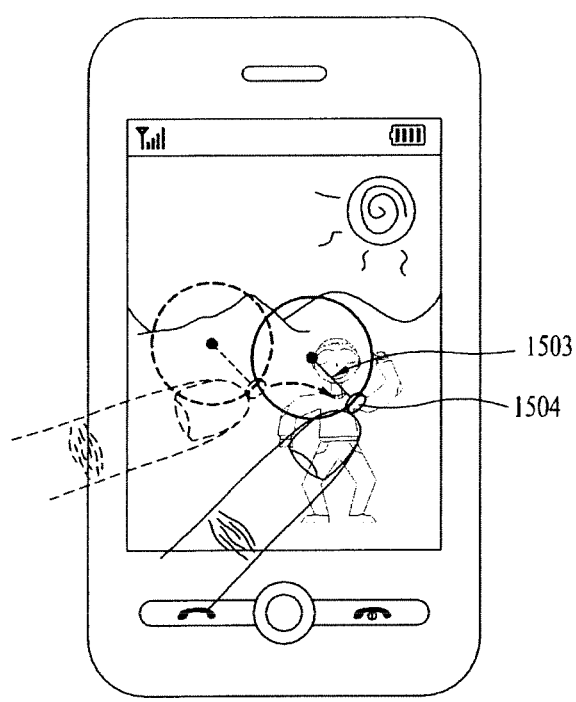
FIG. 20 illustrates an example of the scroll function of the touch screen when the icon is the pin type according to FIG. 15.

FIG. 20 illustrates an example of the mobile terminal 100 performing the scroll function of the touch screen when the pin type icon 1503 is displayed.

As illustrated in FIG. 20, after a point on the touch screen which is separate from icon 1503 is touched by a pointer, such as a finger, the controller 180 may perform the scroll function when the touched point is proximity-dragged. The scroll function of the touch screen was previously described with reference to FIGS. 6-10 and therefore, the detailed description thereof will be omitted.

According to one embodiment of the present invention, the mobile terminal 100 may perform the control method of the touch screen according to a proximity-touch time, a touch time, or a proximity-distance.

Figure 21:
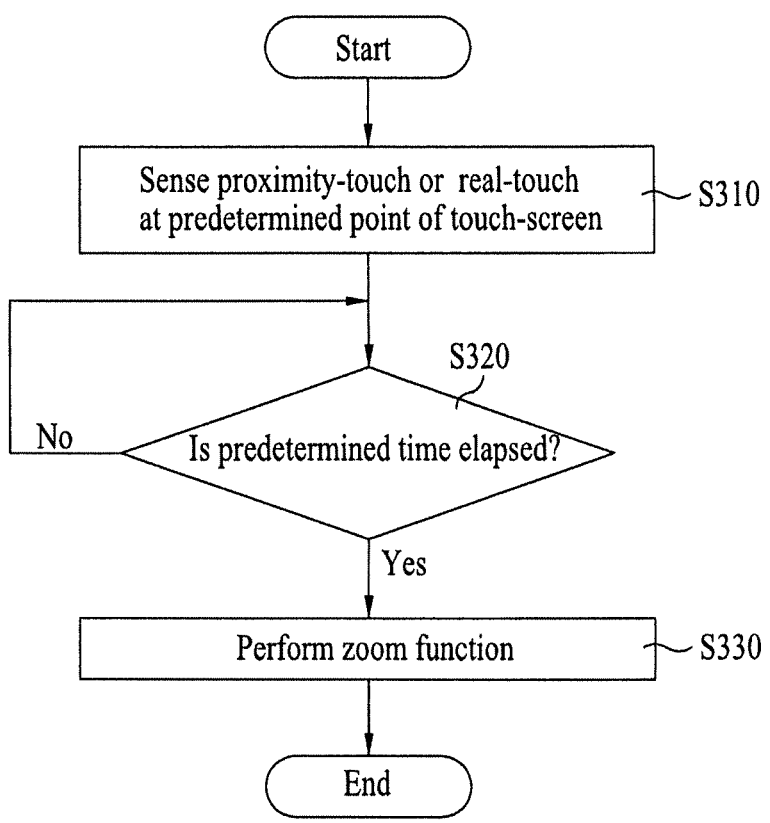
FIG. 21 illustrates a flow chart of a zoom method of the touch screen according to one embodiment of the present invention.

FIG. 21 illustrates a flow chart for a method of performing the zoom function of the touch screen according to one embodiment of the present invention.

The sensing unit 140 may sense the proximity-touch or the real-touch at a point on the display 151 (S310). When the proximity-touch or the touch is maintained for a predetermined time, the controller 180 may perform the zoom function of the touch screen (S320, S330). Therefore, the controller 180 cannot perform the zoom function if the proximity-touch or the touch is released before the predetermined time has elapsed. Additionally, the controller 180 may perform the zoom function of the touch screen according to the touched point or the proximity-touched point. The method according to FIG. 21 may be advantageous when a map is displayed on the touch screen.

FIG. 22 illustrates an example of a method of performing the zoom function according to the method of FIG. 21.

FIG. 22a(1) illustrates an example of performing the zoom-out function of the touch screen via the proximity-touch.

The controller 180 may zoom-out out the touch screen if a predetermined point of the display 151 is proximity-touched for a predetermined time. For example, the controller 180 may set the proximity-touched point on the center of the touch screen and the controller 180 may zoom-out when the center of the touch screen has been proximity touched for a predetermined time. The controller 180 does not zoom-out if the proximity-touch is released before the predetermined time has elapsed. The predetermined time may be a default time or may be set by the user.

The controller 180 may continuously zoom-out for a predetermined time interval while the proximity-touched state is maintained even after the initial zoom-out. The predetermined time interval may be a default or may be set by the user. In this example, a period for continuously performing the zoom-out may be less than the predetermined time required for the initial zoom-out. Finally, the controller 180 may terminate the zoom-out if the proximity-touch is released.

FIG. 22a(2) illustrates an example of performing the zoom-in function of the touch screen by touching the display 151. The controller 180 may zoom-in on the touch screen if a predetermined point of the display 151 is touched for a predetermined time. For example, the controller 180 may set the touch point on the center of the touch screen and the controller 180 may zoom-in when the center of the touch screen has been touched for a predetermined time.

The controller 180 does not perform the zoom-in if the touch is released before the predetermined time has elapsed. Additionally, the controller 180 may continuously zoom-in for a predetermined time interval while the touched state is maintained even after the initial zoom-in. The predetermined time interval may be a default or may be set by the user. In this example, a period for continuously performing the zoom-in may be less than the predetermined time required for the initial zoom-in. Finally, the controller 180 may terminate the zoom-in if the touch is released.

Figure 22B:
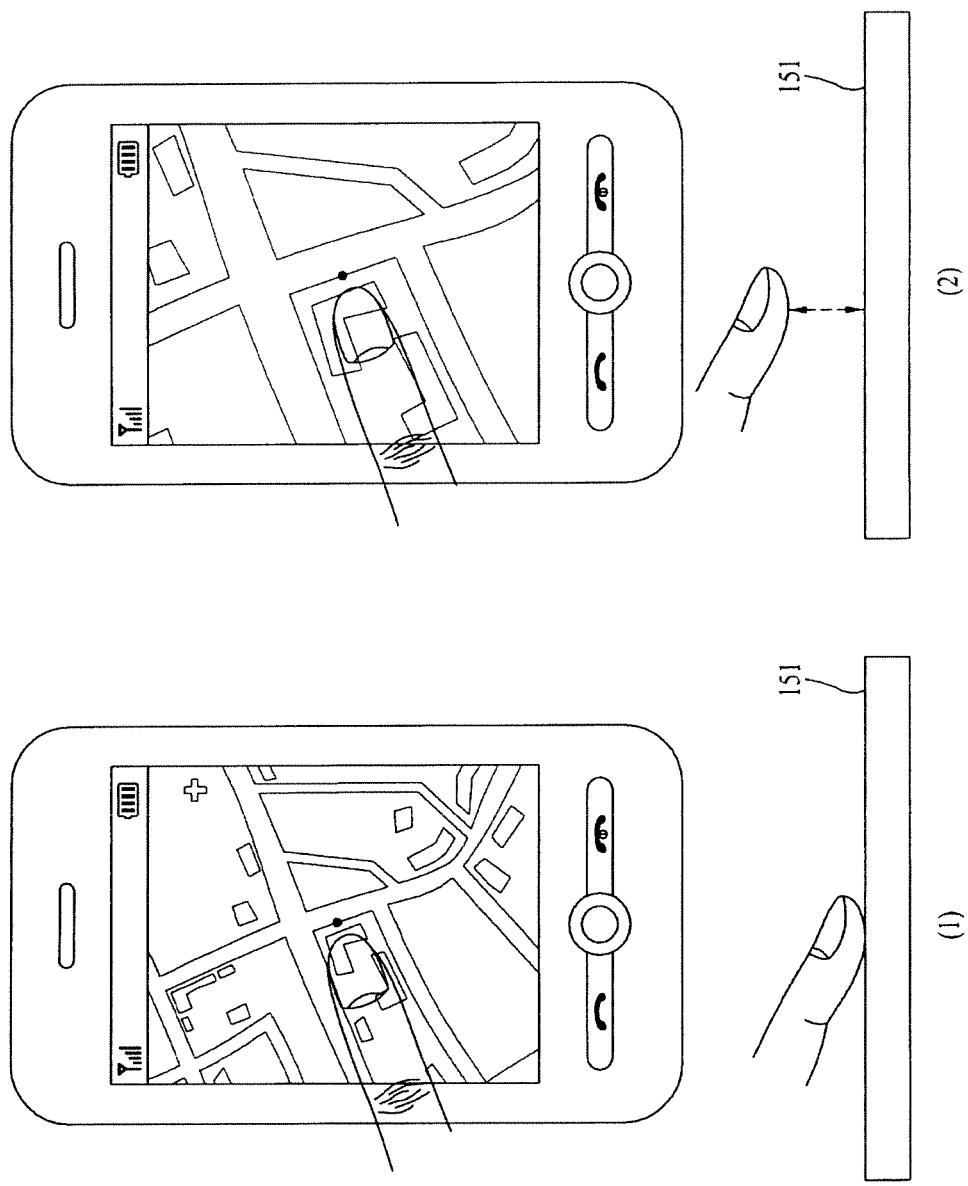
FIG. 22 illustrates an example of the zoom according to FIG. 21.

FIG. 22b(1) illustrates an example of performing the zoom-out function of the touch screen by touching the display 151.

As illustrated in FIG. 22b(1), the controller 180 may zoom-out on the touch screen if a predetermined point of the display 151 is touched for a predetermined time. For example, the controller 180 may set the touch point on the center of the touch screen and the controller 180 may zoom-out when the center of the touch screen has been touched for a predetermined time. The controller 180 does not zoom-out if the touch is released before the predetermined time has elapsed. The predetermined time may be a default time or may be set by the user.

The controller 180 may continuously zoom-out for a predetermined time interval while the touched state is maintained even after the initial zoom-out. The predetermined time interval may be a default or may be set by the user. In this example, a period for continuously performing the zoom-out may be less than the predetermined time required for the initial zoom-out. Finally, the controller 180 may terminate the zoom-out if the touch is released.

FIG. 22b(2) illustrates an example of performing the zoom-in function of the touch screen via the proximity-touch.

The controller 180 may zoom-in on the touch screen if a predetermined point of the display 151 is proximity-touched for a predetermined time. For example, the controller 180 may set the proximity-touch point on the center of the touch screen and the controller 180 may zoom-in when the center of the touch screen has been proximity-touched for a predetermined time.

The controller 180 does not perform the zoom-in if the proximity-touch is released before the predetermined time has elapsed. Additionally, the controller 180 may continuously zoom-in for a predetermined time interval while the proximity-touch state is maintained even after the initial zoom-in. The predetermined time interval may be a default or may be set by the user. In this example, a period for continuously performing the zoom-in may be less than the predetermined time required for the initial zoom-in. Finally, the controller 180 may terminate the zoom-in if the proximity-touch is released.

According to one embodiment of the present invention, the mobile terminal may perform the zoom function according to a proximity-distance.

FIG. 23 illustrates an example of performing the zoom function according to the proximity-distance.

Figure 23A:
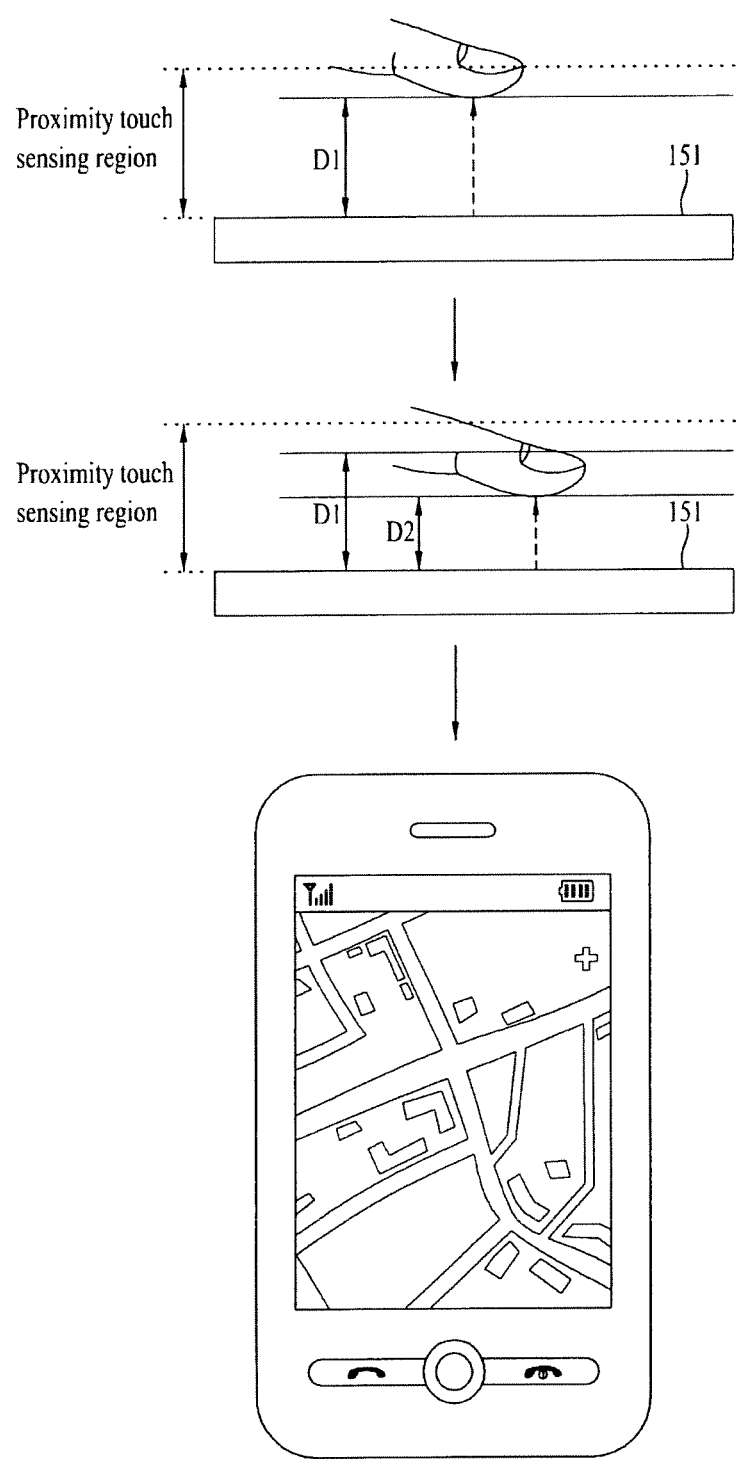
FIG. 23 illustrates an example of performing the zoom according to one embodiment of the present invention.

FIG. 23a illustrates an example of performing the zoom-out function. The controller 180 activates the zoom function when the pointer, such as a finger, is positioned on the proximity-touch sensing region for the predetermined time. If the zoom function is activated, the controller 180 may zoom-out on the touch screen when the proximity-distance is lessened via the user's motion. In this example, the controller 180 may determine the zoom-out level of the touch screen according to the change in the proximity-distance. For example, the zoom-out level increases in proportion to the increase of the proximity-distance. Additionally, the speed for the zoom-out may be determined according to the proximity-speed of the user's motion. For example, the zoom-out speed may increase in relation to the increased speed of the proximity-touch.

Figure 23B:
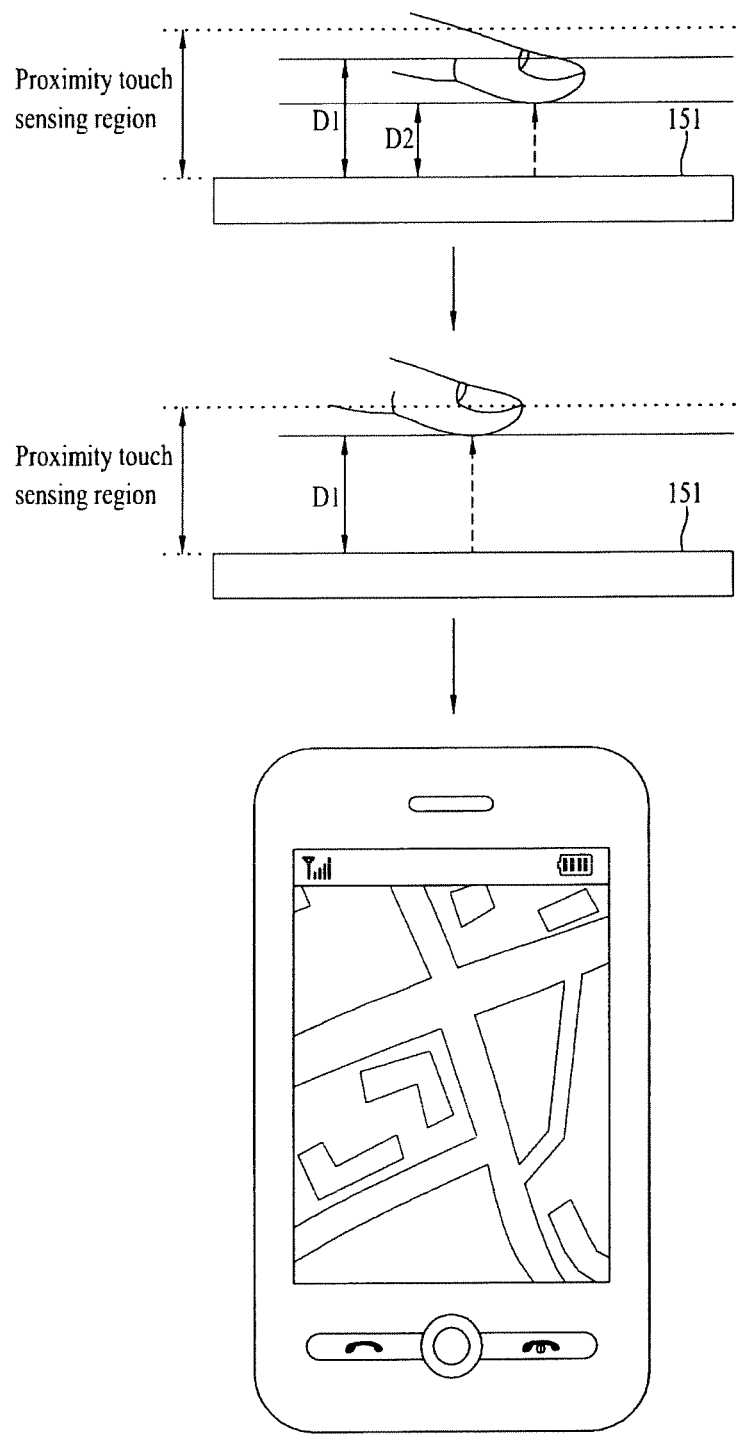

FIG. 23b illustrates an example of performing the zoom-in function as in proportion to the proximity-distance. The controller 180 activates the zoom function when the pointer, such as a finger, is positioned in the proximity-touch sensing region for the predetermined time. For example, the controller 180 may zoom-in on the touch screen according to the change in the proximity-distance. Specifically, the zoom-in level increases in proportion to the increase of the proximity-distance. Additionally, the speed for the zoom-in may be determined according to the proximity-speed of the user's motion. For example, the zoom-in speed may increase in relation to the increased speed of the proximity-touch.

The controller 180 may terminate the zoom function when the proximity-touch is released.

According to one embodiment of the present invention, the mobile terminal may perform a touch screen extension function according to a user setting or a default setting.

Figure 24:
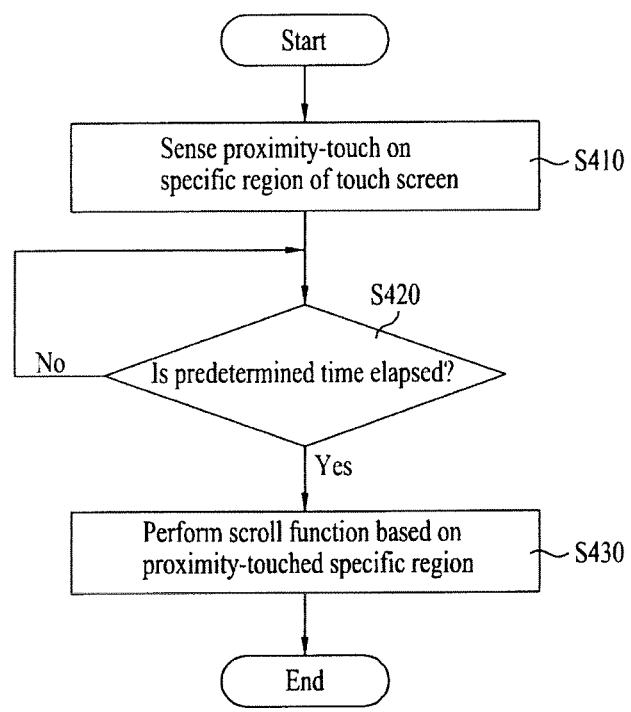
FIG. 24 illustrates a flow chart of a scroll method of the touch screen according to one embodiment of the present invention.

FIG. 24 illustrates a flow chart for a method of performing the scroll function of the touch screen according to the proximity-touch time or the proximity-touch position of the mobile terminal according to one embodiment of the present invention.

The sensing unit 140 may sense the proximity-touch at a point on the display 151 (S410). When the proximity-touch is maintained for a predetermined time, the controller 180 may perform the scroll function of the touch screen (S420, S430). The controller 180 does not perform the zoom function if the proximity-touch is released before the predetermined time is elapsed.

The controller 180 may perform the scroll function of the touch screen according to the position of the proximity-touch point. For example, the controller 180 may activate the scroll function when a specific point of the touch screen, such as a corner region, is proximity-touched. The specific point that activates the scroll function may be set by the user or may be set by default. If a proximity-touch is sensed in a plurality of points, the scroll directions may be determined corresponding to each point. For example, the scroll may be performed in a left direction when a left corner is proximity-touched for the predetermined time, and the scroll is performed in a right direction when a right corner part is proximity-touched for the predetermined time.

Figure 25:
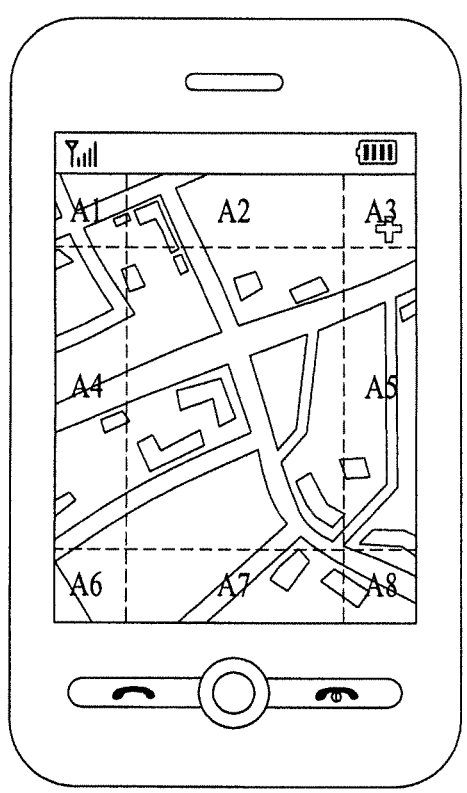
FIGS. 25 and 26 illustrate an example of performing the scroll method according to FIG. 24.

FIG. 25 illustrates an example of performing the scroll function of the touch screen according to the method illustrated in FIG. 24.

As illustrated in FIG. 25, the display 151 may be divided to eight regions A1~A8. The regions A1~A8 are not physically displayed as illustrated in FIG. 25. If one of the eight regions is proximity-touched for a predetermined time, the controller 180 may scroll the touch screen. In this example, the scroll direction may correspond to the proximity-touched region. For example, the controller 180 may scroll the touch screen in a left direction if the "A4" region is proximity-touched for the predetermined time and the controller 180 may scroll the touch screen in a right direction if the "A5" region is proximity-touched for the predetermined time. As stated above the controller 180 may scroll the touch screen in the direction corresponding to the respective touch region A1~A8. The predetermined time may be set by the user or may be set as a default.

Additionally, the eight scroll regions may be combined or divided by the user or by a default setting. Therefore, the number of scroll directions may be determined according to the number of regions prepared for the scroll function.

Moreover, the controller 180 may continuously perform the scroll function in the direction associated with the proximity-touched region when the proximity-touch is maintained even after the initial scroll is performed.

Furthermore, the controller 180 may control the scroll speed in an inverse proportion to the proximity-touch distance. For example, the scroll speed may increase as the proximity-touch distance decreases, and the scroll speed may decrease as the proximity-touch distance increases. Additionally, the scroll speed may be set by the user or a defaulted setting.

According to one embodiment of the present invention, the controller 180 may immediately perform the scroll function once a scroll region has been touched.

Additionally, the controller 180 may terminate the scroll if the proximity-touch is released.

Figure 26:
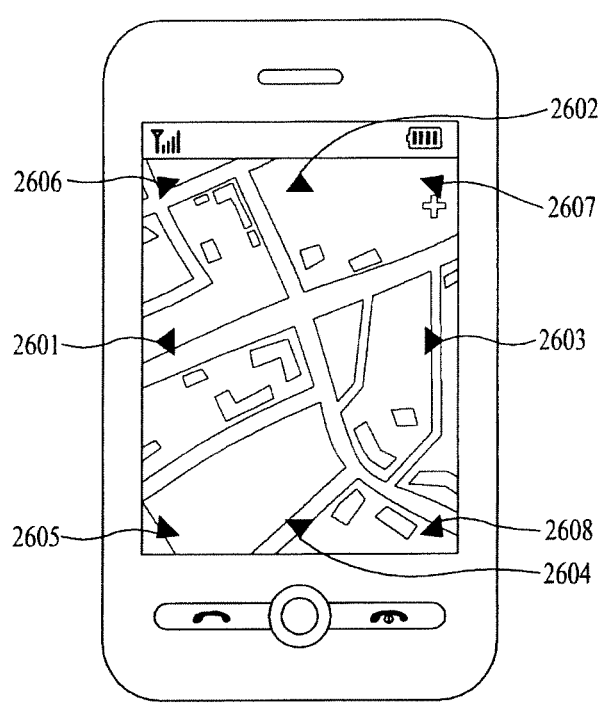

FIG. 26 illustrates an example of performing the scroll function of the touch screen according to the method of FIG. 24.

As illustrated in FIG. 26, eight scroll icons 2601~2608 may be displayed on the touch screen. The controller 180 may scroll the touch screen if any of the icons 2601~2608 are proximity-touched for a predetermined time. In this example, the scroll direction may correspond to the proximity-touched icons 2601~2608. For example, the controller 180 performs the scroll of the touch screen in a left direction if the icon 2601 is proximity-touched for the predetermined time and the controller 180 may perform the scroll of the touch screen in a right direction if the icon 2603 is proximity-touched for the predetermined time. As stated above the controller 180 may scroll the touch screen in the direction corresponding to the respective touch icon 2601~2608. The predetermined time may be set by the user or may be set as a default. Additionally, scroll icons may be added or removed by the user setting or the default setting. For example, if only four scroll icons 2601, 2602, 2603, 2604 are displayed, the touch screen may only scroll in the left, up, right, and down directions. The scroll icons may always be displayed on the touch screen or may be displayed once the proximity-touch is sensed.

Moreover, the controller 180 may continuously perform the scroll function in a direction associated with the proximity-touched scroll icon when the proximity-touch is continuously maintained even after the initial scroll is performed.

Furthermore, the controller 180 may control the scroll speed in an inverse proportion to the proximity-touch distance. For example, the scroll speed may increase as the proximity-touch distance decreases, and the scroll speed may decrease as the proximity-touch distance increases. Additionally, the scroll speed may be set by the user or a defaulted setting.

Finally, according to one embodiment of the present invention, the controller 180 may immediately perform the scroll function once a scroll icon has been proximity-touched. The controller 180 does not need to wait for the proximity-touch to lapse a predetermined time before performing the scroll.

Figure 27:
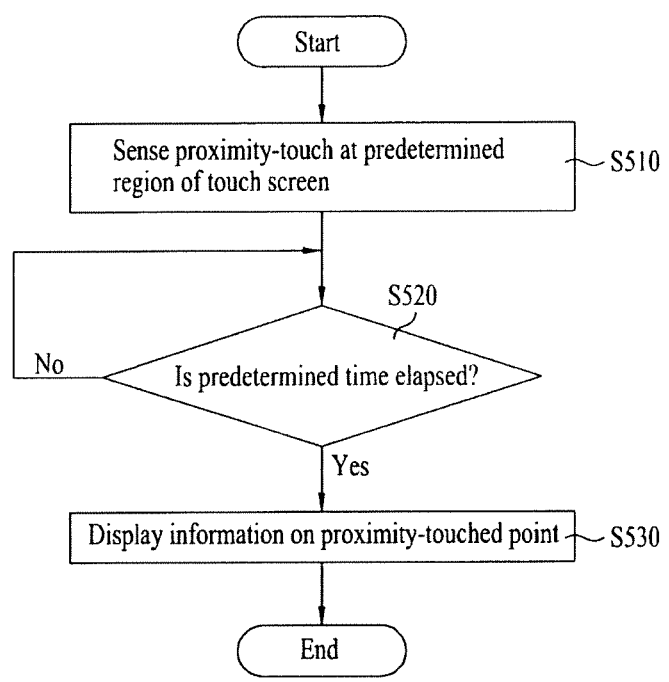
FIG. 27 illustrates a flow chart for an information display method of the mobile terminal according to one embodiment of the present invention.

FIG. 27 illustrates a flow chart for a method of displaying information on the touch screen associated with the position of the proximity-touch or the proximity-touch time position according to one embodiment of the present invention. The sensing unit 140 may sense the proximity-touch at a point of the display 151 (S510). The controller 180 may display the information associated with the proximity-touched point on the touch screen when the proximity-touch at the point is maintained for a predetermined time (S520, S530). Additionally, the controller 180 may not display information if the proximity-touch is released before the predetermined time has elapsed.

The information display function may advantageously be used on the touch screen on which the map is displayed. For example, the controller 180 may display detailed information on a building when the building is proximity-touched for the predetermined time.

The information associated with the specific point on the map may include position-based information. The position-based information may include address information, or point of interest (POI) information. The address information may include the street address, administrative districts, or latitude and longitude information. The POI information may include unique information regarding the location, or specific points of interest within the vicinity of the location. For example, the POI information may include the name of the location, such as "xyz mart", "xyz restaurant", or "xyz department store". Additionally, the POI information may include information for specific points of interest within the vicinity of the location, such as "Italian restaurants within five miles", or "Amusement Parks". Furthermore, the POI information may include image information associated with the specific location. The POI information may be stored in the memory 160 or may be received via the wireless communication unit 110.

FIGS. 28-32 illustrate examples of displaying information associated with the proximity-touched point according to the method of FIG. 27.

Figure 28:
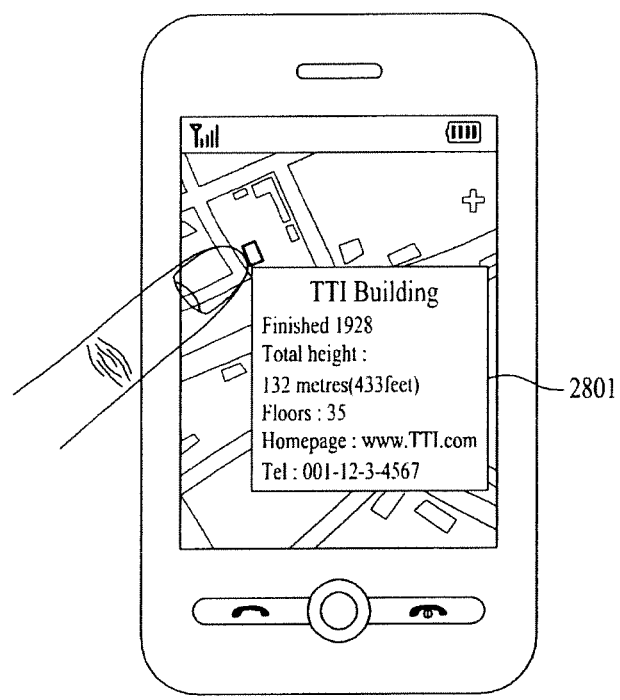
FIGS. 28-32 illustrate examples of the information display method according to FIG. 27.

As illustrated in FIG. 28, the controller 180 may display the detailed information via a window 2801 when a specific location displayed on the map is proximity-touched. For example, the window 2801 may display the height and date of the specific building and the company's telephone number. Additionally, the controller 180 may perform additional functions by touching the detailed information displayed on the window 2801. For example, the controller 180 may access a web page when an Internet address associated with the location is touched. Additionally, the controller 180 may transmit the touched telephone number if the telephone number associated with the building is touched.

Figure 29:
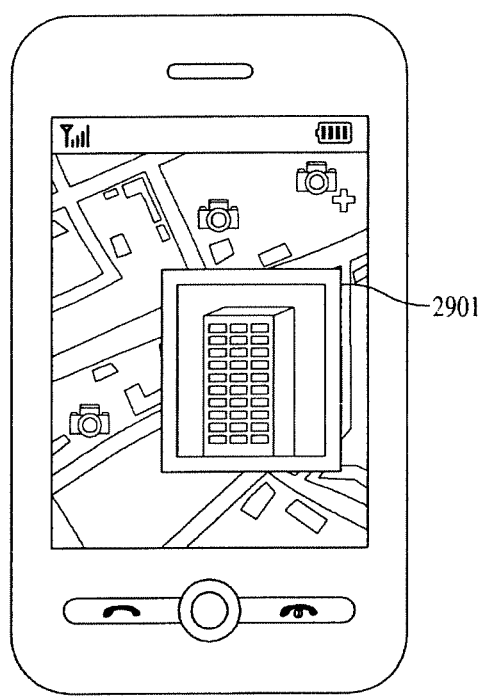

As illustrated in FIG. 29, the controller 180 may display an image 2901 when a specific location displayed on the map is proximity-touched. The user may identify the proximity-touched location via the image 2901, thus allowing the user to find the location associated with the image 2901. Additionally, the controller 180 may expand or display a full-screen image 2901 if the image 2901 is touched.

Figure 30:
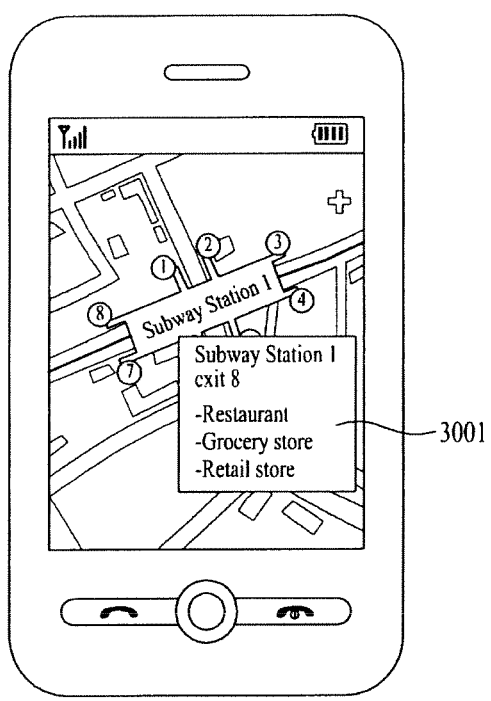

As illustrated in FIG. 30, the controller 180 may display information for a place of interest, a restaurant, a store, or a hospital, located near a proximity-touched location. Additionally, the controller 180 may transmit the telephone number associated with a location displayed in a window 3001 if the location is touched. The telephone number associated with a location may be stored in the memory 160 or may be received via the wireless communication unit 110.

Additionally, the controller 180 may display transportation information for a specific location. For example, the controller 180 may display a train schedule if the specific location is a train terminal.

Figure 31:
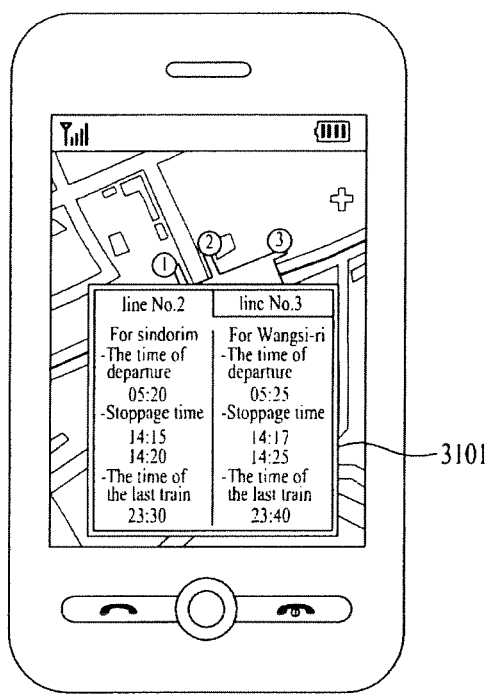

As illustrated in FIG. 31, the controller 180 may display a schedule for a subway routes via the window 3101 when a specific subway station displayed on the map is proximity-touched. The window 3101 may display each route, such as No. 2 subway line and No. 3 subway line, the first departure time for each of the specific routes, the last departure time, and the next train scheduled according to the current time. Furthermore, the controller 180 may display the specific route information for respective subway routes if the route icon is touched or proximity-touched for a predetermined time.

Figure 32:
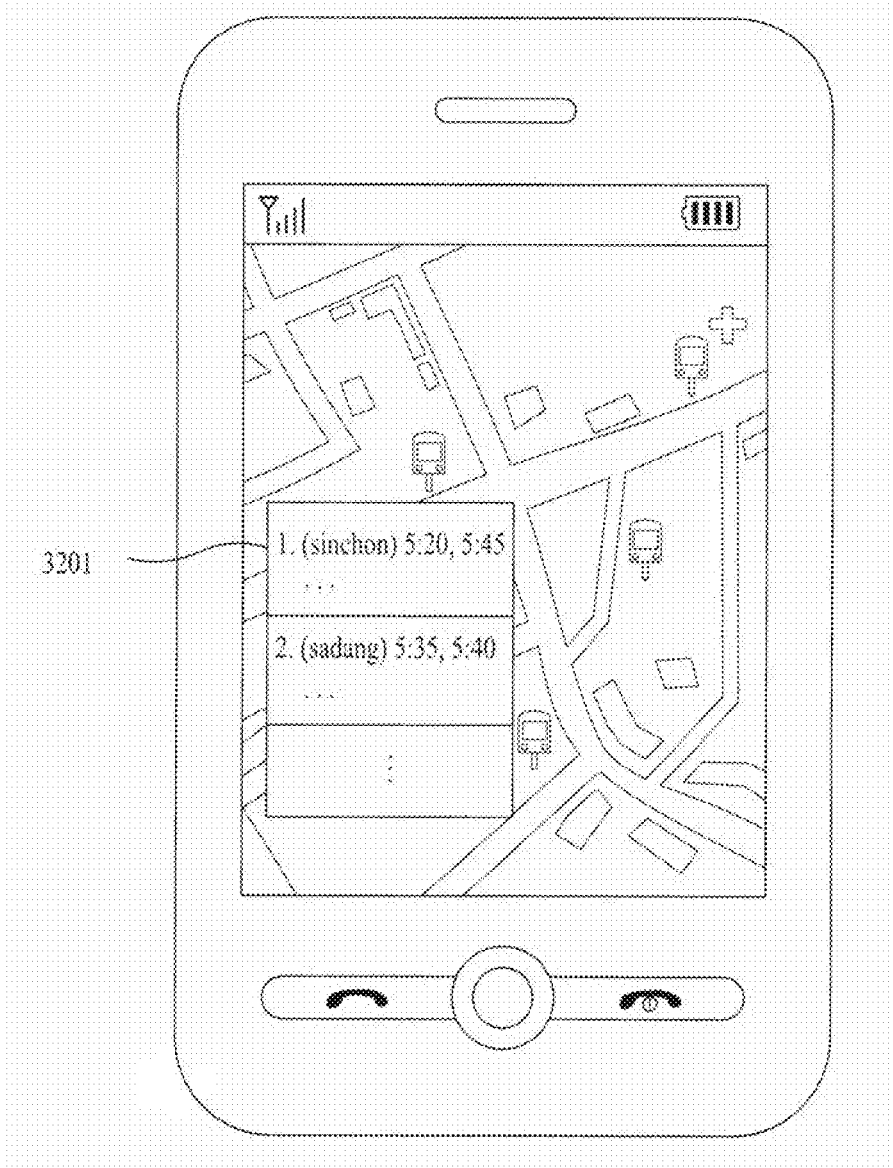

As illustrated in FIG. 32, the controller 180 may display bus schedule information of bus routes which stop at a bus station via a window 3201. The bus schedule information may be displayed when the displayed bus station is proximity-touched. The window 3201 may display the bus routes stopping at the specific bus station, the first departure time for each direction of the specific routes, the last bus time, and the bus scheduled according to the current time. Furthermore, the controller 180 may display the specific route information for respective bus routes if the bus route icon is touched or proximity-touched for a predetermined time.

Additionally, the mobile terminal 100 may receive navigational information of the mass-transit vehicle, such as a bus or subway, according to the current position of the specific mass-transit vehicle and the mass-transit information. The transport protocol experts group (TPEG) information is an example of the transportation information.

According to one embodiment of the present invention the mobile terminal 100 may display a pointing point and a reference line to guide the proximity-touched point when a point on the touch screen is proximity-touched. The pointing point and the reference line enhance the user's ability to perform the zoom function.

Figure 33:
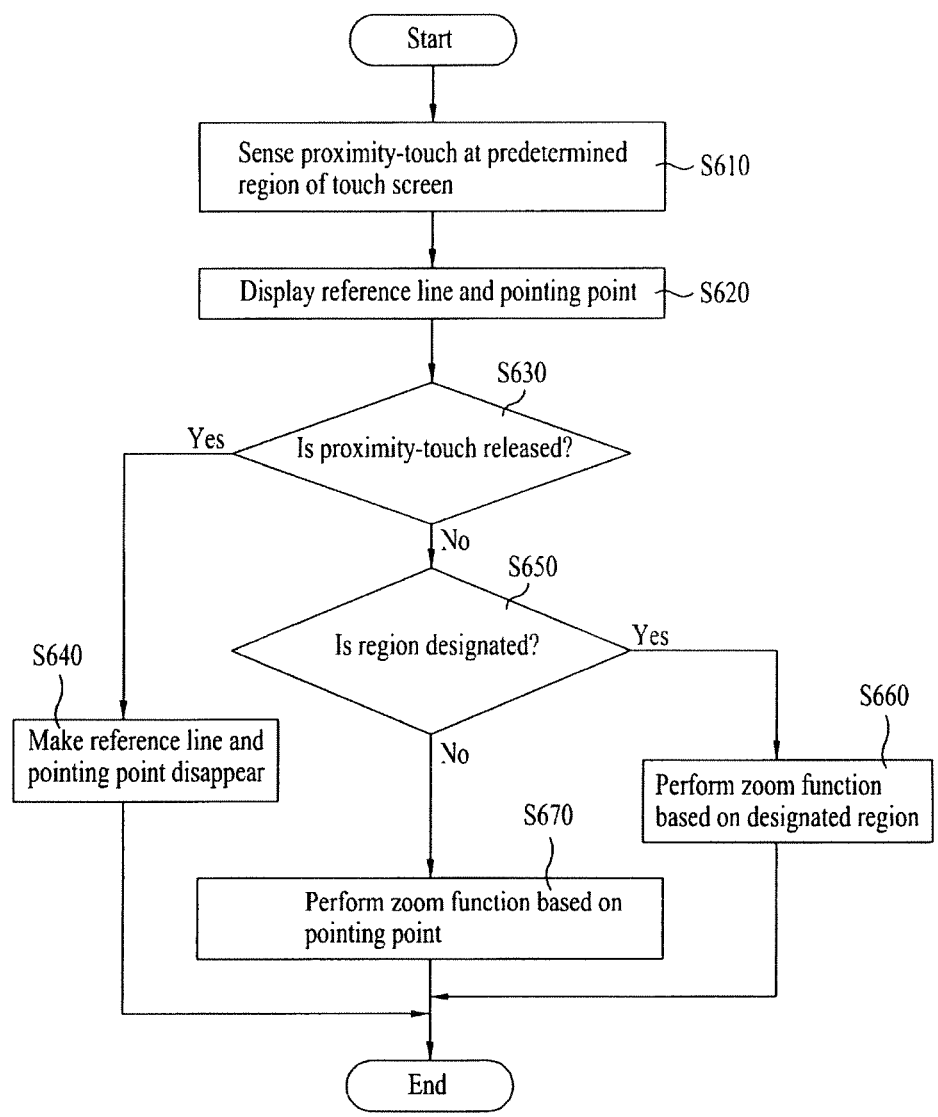
FIG. 33 illustrates a flow chart for a zoom method of the mobile terminal according to one embodiment of the present invention.

FIG. 33 illustrates a flow chart of a method for performing the zoom function in the mobile terminal according to one embodiment of the present invention.

The controller 180 displays the reference line and the pointing point after the sensing unit 140 senses the proximity-touch at a point on the display 151 (S610, S620). The controller 180 may remove the displayed reference line and pointing point when the proximity-touch is released (S630, S640).

The mobile terminal 100 according to one embodiment of the present invention can perform various functions using the proximity-touch. At this time, the positions of the proximity-touched point may be an important factor. Therefore, the mobile terminal 100 accurately informs the user of which point the proximity-touched position is, so that the convenience of the proximity-touch input can be provided to the user.

Additionally, the controller 180 may perform the zoom function according to the designated region (S650, S660). For example, the controller 180 may perform the zoom function by designating the specific region as the center of the touch screen.

Furthermore, the controller 180 may perform the zoom function according to a pointing point (S650, S670). For example, the controller 180 may perform the zoom function according to the pointing point of the specific input signal. The method illustrated in FIG. 33 may be advantageously used when a map is displayed on the screen.

Figure 34:
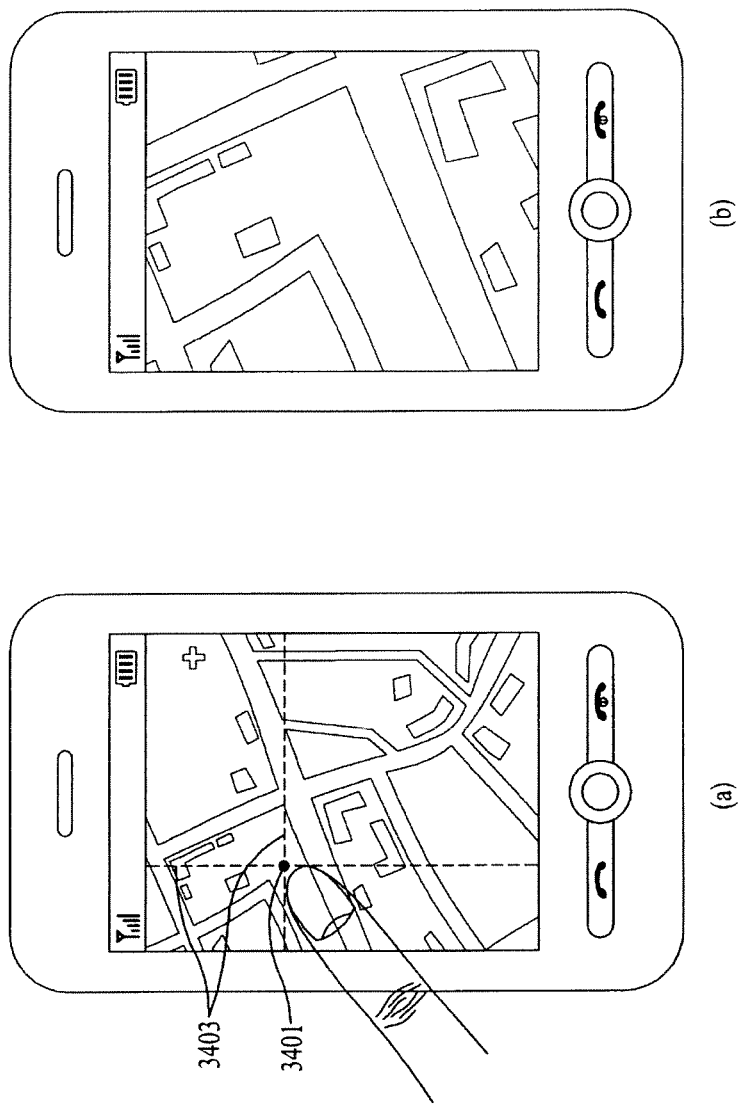
FIGS. 34 and 35 illustrate examples of the zoom method according to FIG. 33.

FIG. 34 illustrates performing the zoom function in the mobile terminal according to the method of FIG. 33.

As illustrated in FIG. 34a, when a point on the touch screen is proximity-touched the controller 180 displays a pointing point 3401 and reference lines 3403. In this example, the positions of the pointing point 3401 and the reference lines 3403 move according to the movement of the proximity-touch pointer.

The controller 180 may perform the zoom-in function according to the pointing point 3401 when the pointing point 3401 is touched. For example, the controller 180 may zoom-in after the pointing point 3401 is positioned at the center of the touch screen. Additionally, the controller 180 may continuously zoom-in when the touch is maintained. The controller 180 may stop the zoom-in when the touch of the pointing point 3401 is released.

Alternatively, the method according to FIG. 34 may be configured to perform a zoom-out function.

Moreover, the controller 180 may zoom-out on the touch screen according to the touched point when the pointing point 3401 is touched for the predetermined time and may zoom-in on the touch screen according to the proximity-touched point when the pointing point 3401 is proximity-touched for the predetermined time. The procedure described above is similar to the method of FIG. 22 and therefore, the detailed description will be omitted.

Additionally, the controller 180 can perform the zoom-function according to the proximity-distance. The zoom-function according to the proximity-distance is similar to the method of FIG. 23 and therefore, the detailed description will be omitted.

Figure 35:
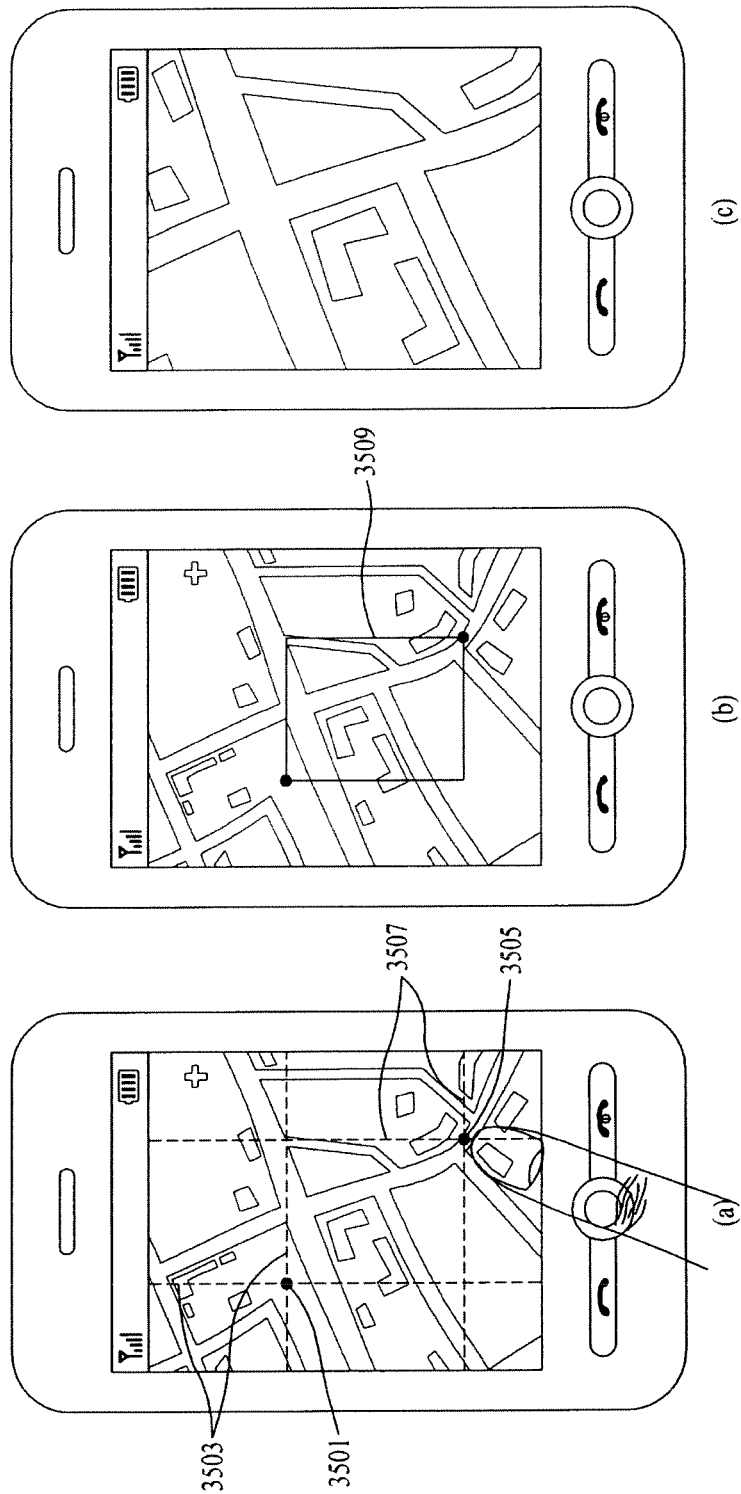

FIG. 35 illustrates an example of a method of performing the zoom function in the mobile terminal according to the method of FIG. 33.

As illustrated in FIG. 35a, the controller 180 may designate a specific region via a first pointing point 3501 and a second pointing point 3503. The controller 180 displays the first pointing point 3501 and first reference lines 3503 when a point on the touch screen is proximity-touched. In this example, the positions of the first pointing point 3501 and the first reference lines 3503 move according to the movement of the proximity-touched pointer. The controller 180 may fix the positions of the first pointing point 3501 and first reference lines 3503.

The controller may display a second pointing point 3505 and second reference lines 3507 if the first pointing point 3501 and the first reference lines 3503 are fixed. The second pointing point 3505 and second reference lines 3507 may be displayed after a second point on the touch screen is proximity-touched. In this example, the positions of the second pointing point 3505 and the second reference lines 3507 move according to the movement of the proximity-touched pointer. The controller 180 may fix the positions of the second pointing point 3505 and the second reference lines 3507 when the second pointing point 3505 is touched.

As illustrated in FIG. 35*b*, the controller 180 designates (a region 3509 enclosed by the first reference line 3503 and the second reference line 3507 if the first pointing point 3501 and the second pointing point 3505 are fixed.

The controller 180 may perform the zoom function according to input received in the designated region 3509. FIG. 35*c* illustrates an example of performing the zoom-in function.

The controller 180 may perform the zoom function of the designated region 3509 via various methods. For example, the controller 180 may perform the zoom function after recognizing the touch or the proximity-touch of any point in the region 3509.

For example, the controller 180 may zoom-out the touch screen according to the region 3509 if any point of the region 3509 is touched for the predetermined time and may zoom-in the touch screen if any point of the region 3509 is proximity-touched for the predetermined time. The zoom function is similar to the method of FIG. 22 and therefore, the detailed description will be omitted.

Figure 36:
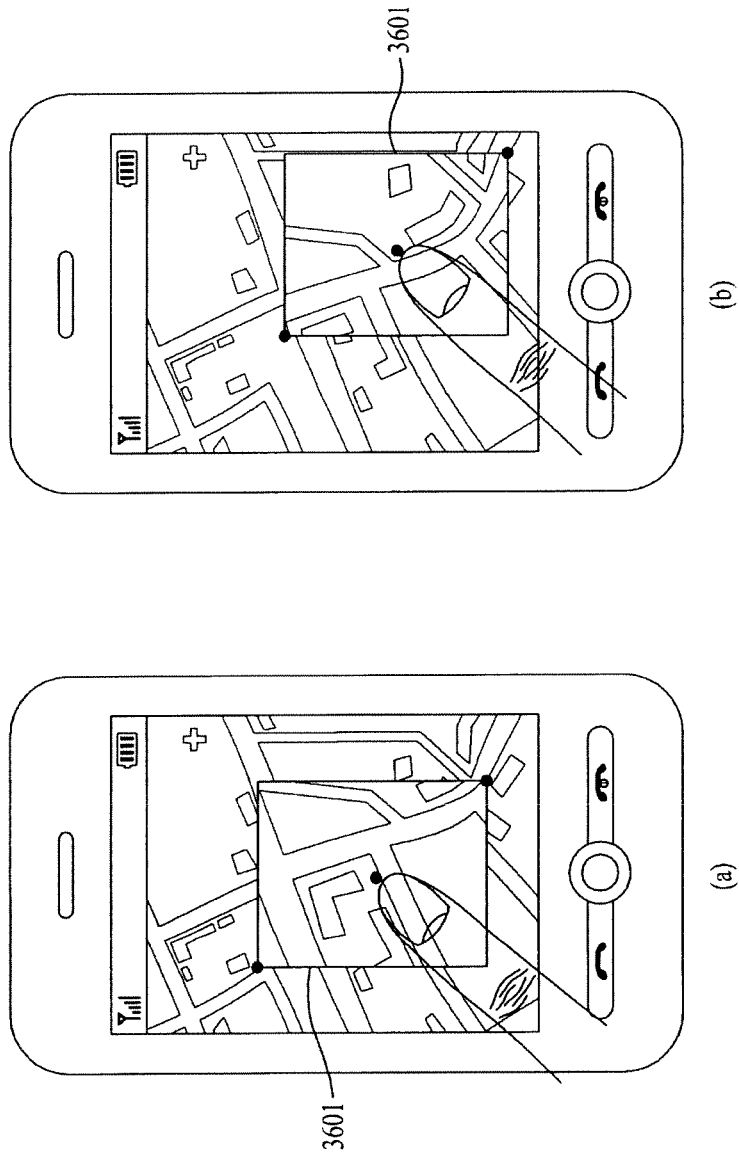
FIG. 36 illustrates an example of designating a specific region in the mobile terminal to enlarge the designated region according to one embodiment of the present invention.

Additionally, the controller 180 may zoom-in a specific region of the touch screen. FIG. 36 illustrates an example of zooming-in a specific region of the touch screen. As illustrated in FIG. 36*a*, the controller 180 may only zoom-in the region 3601. This is similar to an effect of viewing the specific region 3601 through a magnifying glass. The magnification may be inversely proportional to the proximity-distance. For example, the magnification may increase as the proximity-distance decreases and the magnification may decease as the proximity-distance increases.

As illustrated in FIG. 36*b*, the controller 180 may move the magnified region 3601 according to the proximity-drag when any point of the specific region 3601 is proximity-dragged. In this example, the controller 180 may simultaneously change the display position and the magnification when the proximity-drag and the proximity-distance are adjusted.

According to one embodiment of the present invention, the mobile terminal may display the information associated with the proximity-touched region when the zoom-in function is completed by the method illustrated in FIGS. 34 and 35. The information associated with the proximity-touched region may include the address information of the point, point of interest (POI) information, weather information, or road information.

Figure 37:
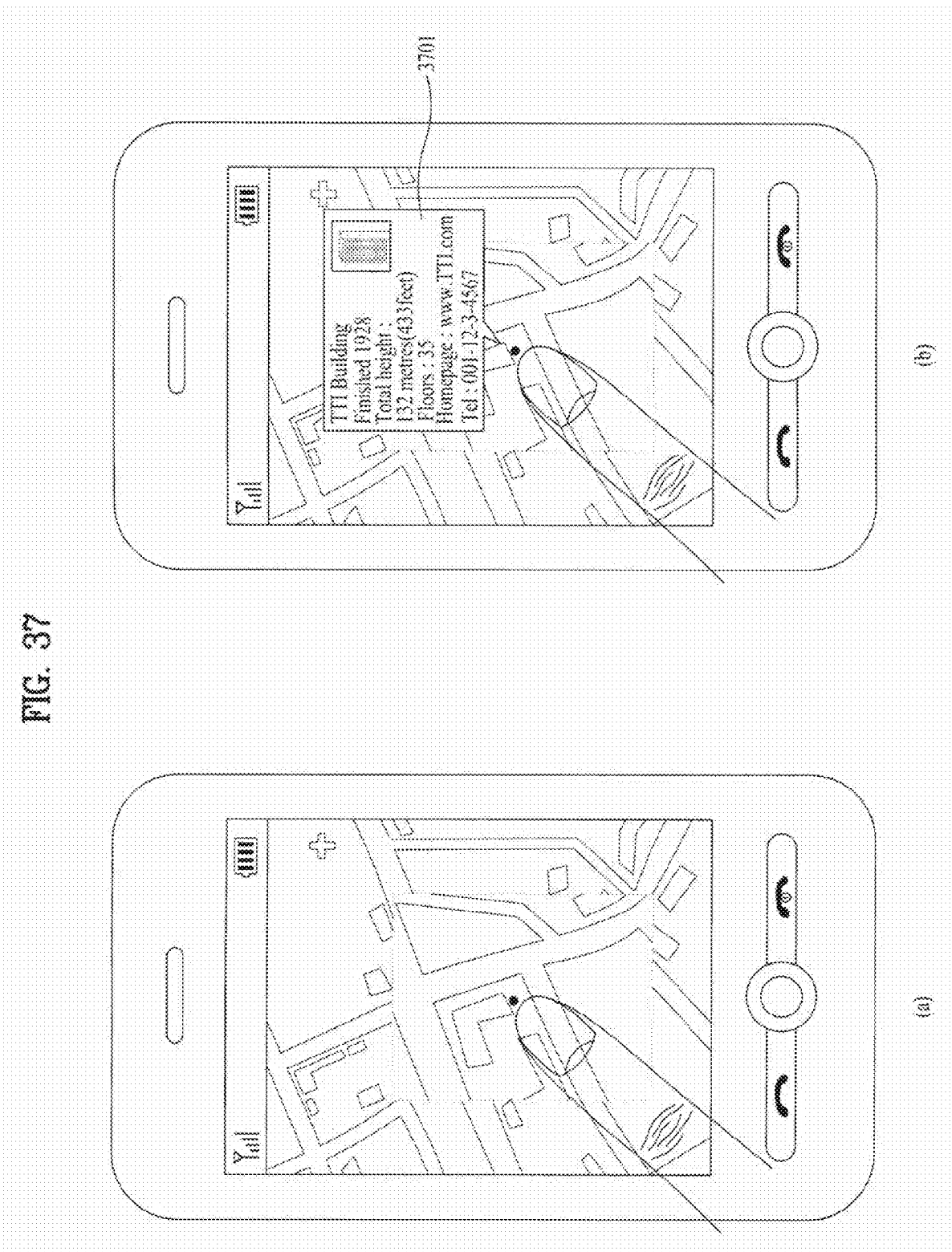
FIG. 37 illustrates an example of displaying detailed information associated with a specific area using the proximity-touch in the mobile terminal according to one embodiment of the present invention.

FIG. 37 illustrates an example of a method of displaying detailed information associated with specific locations according to one embodiment of the present invention.

FIG. 37*a* illustrates an example of the zoom-in function of the touch screen according to FIGS. 34 and 35. In this example, the controller 180 may display the detailed information when a point of the touch screen is proximity-touched. For example, the controller 180 may display detailed information on a building via a window 3701 when the proximity-touched point is a location of a building. The window 3701 may display an Internet address associated with the building, a telephone number associated with the building, or an image associated with the building. The controller 180 may perform additional functions by touching the detailed information displayed on the window 3701. For example, the controller 180 may access a web page when an Internet address associated with the location is touched. Additionally, the controller 180 may transmit the touched telephone number if the telephone number associated with the building is touched. The controller 180 may also expand and full-screen display the image when the image associated with the building is touched.

Figure 38:
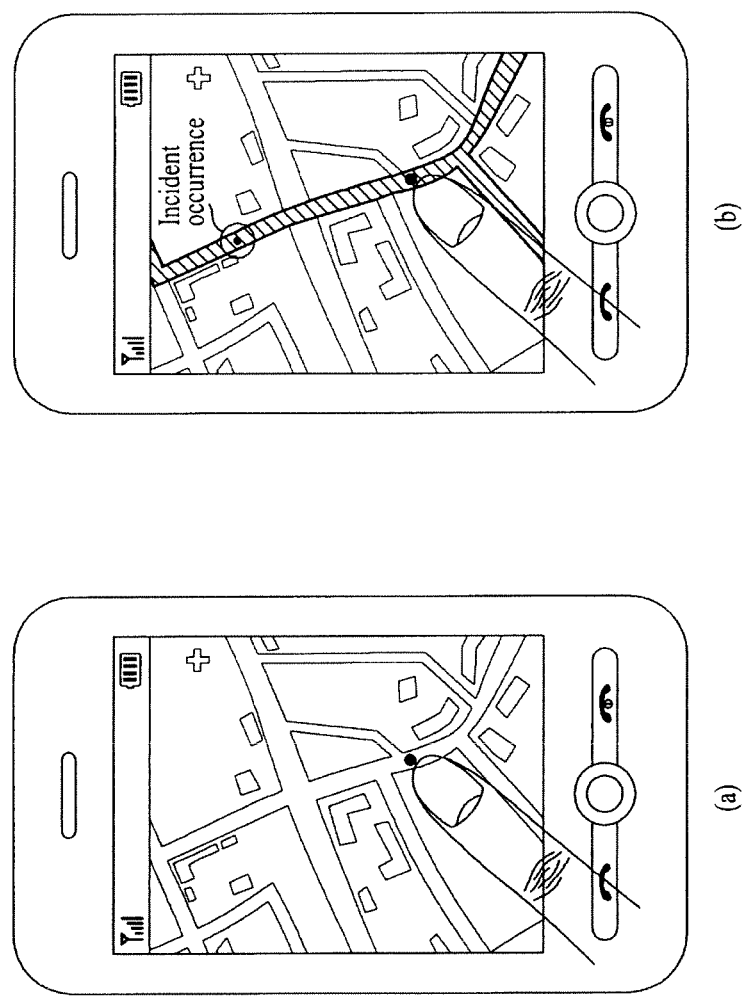
FIG. 38 illustrates an example of displaying information associated with a specific road using the proximity-touch in the mobile terminal according to one embodiment of the present invention.

FIG. 38 illustrates an example of a method for displaying the information associated with a specific road according to one embodiment of the present invention.

As illustrated in FIG. 38*a*, the controller 180 may highlight a road when the road is proximity-touched on the touch screen. The user may recognize the specific road by the identifiable display. In this example, the controller 180 may simultaneously display the transportation information on the selected road. For example, the controller 180 may display an accident point when an accident occurs on the selected road. Additionally, the controller 180 may guide an alternate route to avoid traffic delays (not shown). The controller 180 may remove all road information when the proximity-touch is released.

Additionally, the mobile terminal may display the weather information associated with a region when the a point on the touch screen is proximity-touched. The weather information may include rainfall probability information, temperature information, or wind information.

FIG. 39 illustrates an example of displaying weather information using the proximity-touch of the mobile terminal according to one embodiment of the present invention.

As illustrated in FIG. 39*a*, the controller 180 may display the weather information via icons 3901, 3903, 3905 when a point on the map is proximity-touched. Specifically, the controller 180 may display the icon 3901 associated with yesterday's weather, the icon 3903 associated with today's weather, and the icon 3905 associated with tomorrow's weather. The controller 180 may remove the icons 3901, 3903, 3905 when the proximity-touch is released.

As illustrated in FIG. 39*b*, the controller 180 may display detailed weather information associated with a respective icon if one of the icons 3901, 3903, 3905 is touched. The detailed information associated with today's weather is displayed on the window 3907. The window 3907 may include the temperature information and the rainfall probability information.

Figure 40:
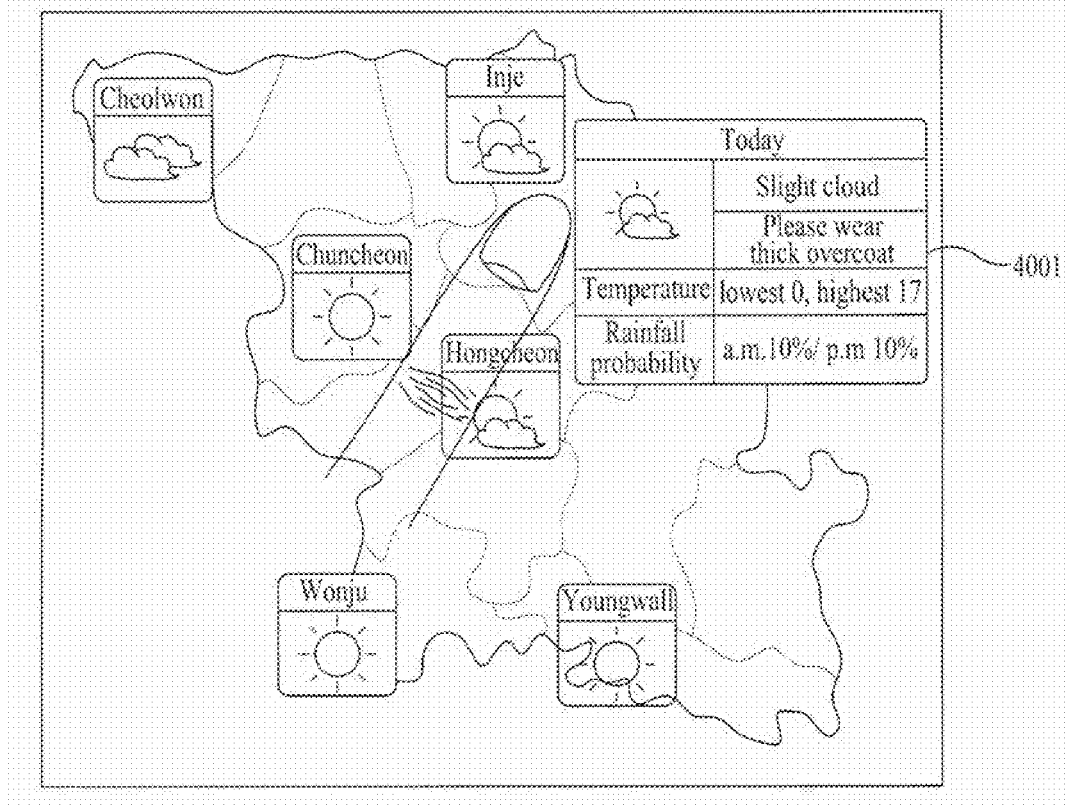

FIG. 40 illustrates an example of displaying the weather information using the proximity-touch according to one embodiment of the present invention.

As illustrated in FIG. 40, the controller 180 may display the detailed information of the specific icons via a window 4001 when an icon is proximity-touched. The window 4001 may include the temperature and the rainfall probability information. The controller 180 may remove the window 4001 when the proximity-touch is released.

Figure 41:
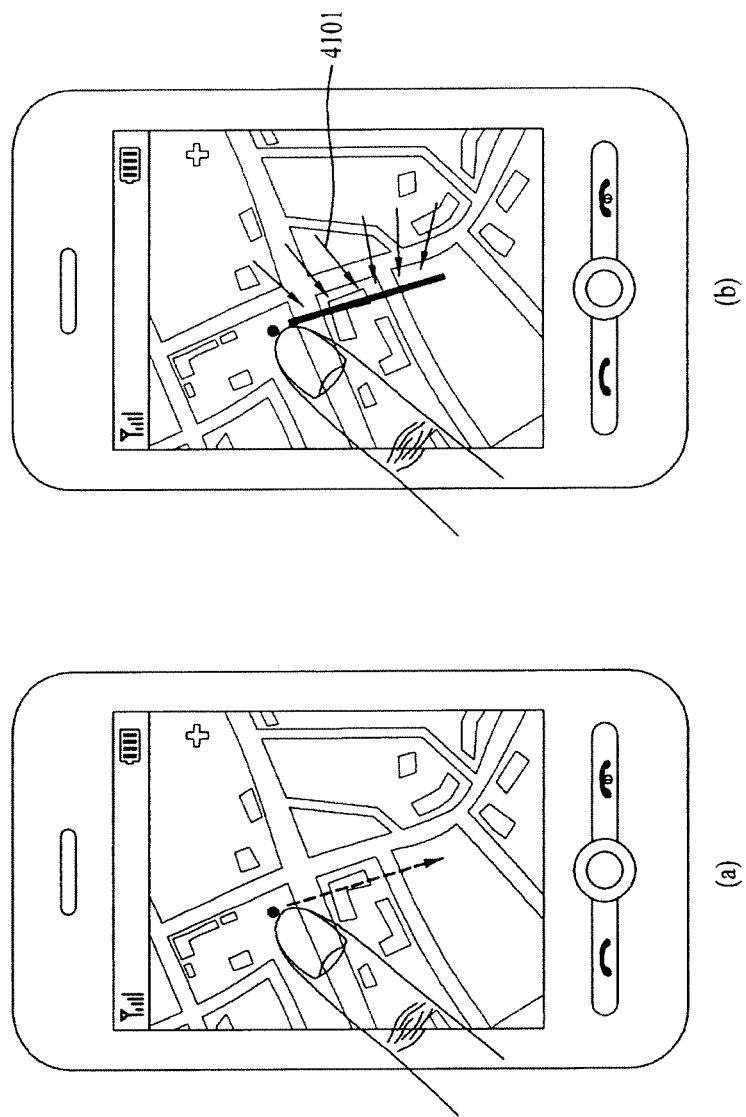
FIGS. 41 and 42 illustrate examples of displaying hazardous element information of the weather information using the proximity-touch in the mobile terminal according to one embodiment of the present invention.

FIG. 41 illustrates an example of displaying the wind information of the weather information using the proximity-touch in the mobile terminal according to one embodiment of the present invention.

As illustrated in FIG. 41*a*, the user can perform the proximity-drag on the predetermined region on the map using a pointer, such as a finger. As illustrated in FIG. 41*b*, after the proximity-drag is performed, the controller 180 may display information of hazardous elements, such as wind, sleet, sand, or hail, associated with the proximity-dragged position via the arrow icons 4101. The strength of the hazardous elements may be determined via the thickness and length of the arrow icon 4101 and a direction of the hazardous elements may be determined via the arrow direction. In this example, the controller 180 may display the detailed information on the wind corresponding to the proximity-dragged region when the arrow icon 4101 is touched (not shown). Additionally, the controller 180 may remove the arrow icon 4101 when the proximity-touch is released.

Figure 42:
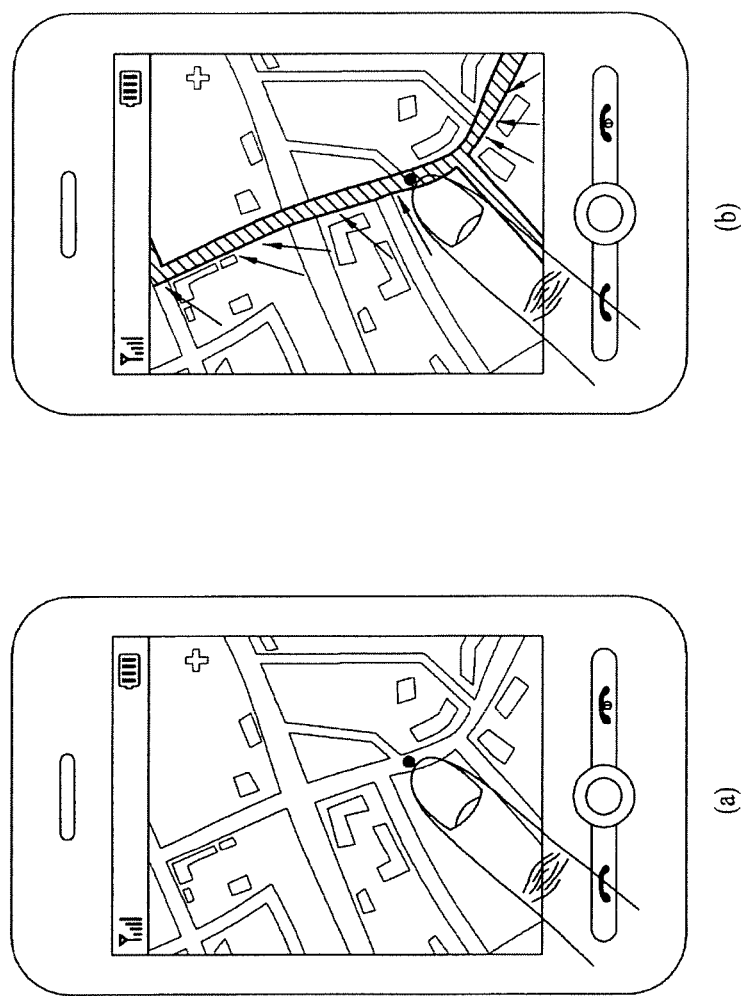

FIG. 42 illustrates another example of displaying the hazardous element information of the weather information using the proximity-touch in the mobile terminal.

As illustrated in FIGS. 42*a* and 42*b*, when a road is proximity-touched on the touch screen, the controller 180 may highlight the road as well as display the hazardous element information via the arrow icons 4101. In this example, the controller 180 may simultaneously display the transportation information on the selected road. For example, the controller 180 can recommend another road if the hazardous elements are blowing towards the selected road. The hazardous element information may be determined via characteristics of the icon 4101. For example, the strength of hazardous elements may be determined via the thickness and length of the arrow icon and a direction of the hazardous elements may be recognized via the arrow direction. In this example, the controller 180 may display the detailed information of the hazardous elements when the arrow icon 4101 is touched (not shown). The controller 180 may remove the arrow icon when the proximity-touch is released.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a display including a touchscreen configured to receive a contact touch and to display a content, wherein the display comprises a first region and a second region, wherein the first region is included within a perimeter, and wherein the second region is located outside of the perimeter of the first region such that the second region encompasses the first region, and wherein the second region is located near an edge of the content;
a sensor configured to sense an object in near-proximity to the display; and
a controller configured to:
cause the display to display a first graphic element in response to sensing that the object is located in near-proximity to a location on the first region of the display, wherein a displayed location of the first graphic element corresponds to the location on the first region of the display at which the object is sensed,
and wherein a change in location at which the object is sensed causes a corresponding change in the displayed location of the first graphic element;
cause the display to display a second graphic element in response to sensing the object in near-proximity to the second region of the display, wherein a displayed location of the second graphic element is within the second region of the display, and wherein the second graphic element is different than the first graphic element and indicates a direction for scrolling the content; and
cause repeated scrolling of the content in response to repeated sensing that the object is in near-proximity to the second region of the display.

2. The mobile terminal of claim 1, wherein the object is sensed in near-proximity to the display when the object is located within a predetermined distance but apart from the display.

3. The mobile terminal of claim 1, wherein the sensor is configured to sense the object in near-proximity to the display by using electromagnetic force without a mechanical contact.

4. The mobile terminal of claim 1, wherein the controller controls a scroll speed according to a distance of the sensed object away from the display.

5. The mobile terminal of claim 1, wherein the controller applies a zoom function to the content appearing on the display when the object contacts a predetermined point on the display and moves away from the predetermined point while in near-proximity to the display.

6. The mobile terminal of claim 1, wherein the controller applies a rotation function to the content appearing on the display when the object contacts a predetermined point on the display and rotationally moves with respect to the predetermined point while in near-proximity to the display.

7. The mobile terminal of claim 1, wherein the controller displays the first graphic element when the object is in near-proximity to the display.

8. The mobile terminal of claim 7, wherein the controller applies a zoom function to the content appearing on the display when the object contacts a predetermined portion of the first graphic element and linearly moves with respect to the predetermined portion while contacting the display.

9. The mobile terminal of claim 1, wherein the controller is configured to repeatedly scroll the content as long as the object stays in near-proximity to the second region of the display, and
terminate scrolling the content when the object is no longer being in near-proximity to the second region of the display.

10. The mobile terminal of claim 1, wherein the second region comprises a plurality of areas within the display.

11. The mobile terminal of claim 10, wherein the plurality of areas correspond to at least two of top, bottom, left, or right sides of the display.

12. The mobile terminal of claim 1, wherein the controller is configured to execute a different function other than the scrolling the content when the object is located in near-proximity to the first region.

13. The mobile terminal of claim 1, wherein the content is scrolled when the object stays in near-proximity to the second region for a predetermined time.

14. The mobile terminal of claim 1, wherein the second region comprises a top region and a bottom region,
wherein the top region extends from a top edge of the display toward a top portion of the first region;
wherein the bottom region extends from a bottom edge of the display toward a bottom portion of the first region;
wherein the displayed location of the second graphic element is within the top region in response to sensing the object in near-proximity to the top region; and
wherein the displayed location of the second graphic element is within the bottom region in response to sensing the object in near-proximity to the bottom region.

15. The mobile terminal of claim 1, wherein the repeatedly scrolling of the content causes the content to scroll through the first region and the second region, and wherein the displayed second graphic element obscures a portion of the content.

16. The mobile terminal of claim 1, wherein the repeated sensing that the object is in near-proximity to the second region of the display occurs when the object is maintained in near-proximity to the second region.

17. The mobile terminal of claim 1, wherein the controller is further configured to:

cause the display to display an animation in response to the sensing that the object is located in near-proximity to the location within the first region of the display.

18. The mobile terminal of claim 1, wherein the first graphic element comprises an animation.

19. The mobile terminal of claim 1, wherein the edge of the content is any one of a plurality of edges of the content.

20. The mobile terminal of claim 1, wherein the first region is different from the second region.

21. The mobile terminal of claim 1, wherein the edge of the content at which the second region is located is an end region of the content.

22. A method for scrolling at a mobile terminal, the method comprising:
 displaying, on a display including a touchscreen, content, wherein the display comprises a first region and a second region, wherein the first region is included within a perimeter, and wherein the second region is located outside of the perimeter of the first region such that the second region encompasses the first region, and wherein the second region is located near an edge of the content;
 displaying, on the display, a first graphic element in response to sensing that the object is located in near-proximity to a location on the first region of the display, wherein a displayed location of the first graphic element corresponds to the location on the first region of the display at which the object is sensed,
 and wherein a change in location at which the object is sensed causes a corresponding change in the displayed location of the first graphic element; and
 displaying, on the display, a second graphic element in response to sensing the object in near-proximity to the second region of the display, wherein a displayed location of the second graphic element is within the second region of the display, and wherein the second graphic element is different than the first graphic element and indicates a direction for scrolling the content; and
 repeatedly scrolling the content in response to repeated sensing that the object is in near-proximity to the second region of the display.

23. The method of claim 22, wherein the object is sensed in near-proximity to the display when the object is located within a predetermined distance but apart from the display.

24. The method of claim 22, wherein the object in near-proximity to the display is sensed by using electromagnetic force without a mechanical contact.

25. The method of claim 22, further comprising controlling a scroll speed according to a distance of the sensed object away from the display.

26. The method of claim 22, further comprising applying a zoom function to the content appearing on the display when the object contacts a predetermined point on the display and moves away from the predetermined point while in near-proximity to the display.

27. The method of claim 22, further comprising applying a rotation function to the content appearing on the display when the object contacts a predetermined point on the display and rotationally moves with respect to the predetermined point while in near-proximity to the display.

28. The method of claim 22, further comprising displaying the first graphic element when the object is in near-proximity to the display.

29. The method of claim 28, further comprising applying a zoom function to the content appearing on the display when the object contacts a predetermined portion of the first graphic element and linearly moves with respect to the predetermined portion while contacting the display.

30. The method of claim 22, further comprising repeatedly scrolling the content as long as the object stays in near-proximity to the second region of the display, and terminating scrolling the content when the object is no longer in near-proximity to the second region of the display.

31. The method of claim 22, wherein the second region comprises a plurality of areas within the display.

32. The method of claim 31, wherein the plurality of areas correspond to at least two of top, bottom, left, or right sides of the display.

33. The method of claim 22, further comprising executing a different function other than the scrolling the content when the object is located in near-proximity to the first region.

34. The method of claim 22, wherein the content is scrolled when the object stays in near-proximity to the second region for a predetermined time.

35. The method of claim 22, wherein the second region comprises a top region and a bottom region,
 wherein the top region extends from a top edge of the display toward a top portion of the first region;
 wherein the bottom region extends from a bottom edge of the display toward a bottom portion of the first region;
 wherein the displayed location of the second graphic element is within the top region in response to sensing the object in near-proximity to the top region; and
 wherein the displayed location of the second graphic element is within the bottom region in response to sensing the object in near-proximity to the bottom region.

36. The method of claim 22, wherein the repeatedly scrolling of the content causes the content to scroll through the first region and the second region, and wherein the displayed second graphic element obscures a portion of the content.

37. The method of claim 22, wherein the repeated sensing that the object is in near-proximity to the second region of the display occurs when the object is maintained in near-proximity to the second region.

38. The method of claim 22, wherein the edge of the content is any one of a plurality of edges of the content.

39. The method of claim 22, wherein the first region is different from the second region.

40. The method of claim 22, wherein the edge of the content at which the second region is located is an end region of the content.

41. A mobile terminal, comprising:
 a display including a touchscreen configured to receive a contact touch and to display a content, wherein the display comprises a first region, a second region, and a third region, wherein the second region is located near a first edge of the content, wherein the third region is located near a second edge of the content, and wherein the first edge and the second edge are located at opposing sides of the content;
 a sensor configured to sense an object in near-proximity to the display; and
 a controller configured to:
 cause the display to display a first graphic element in response to sensing that the object is located in near-proximity to a location on the first region of the display, wherein a displayed location of the first graphic element corresponds to the location on the first region of the display at which the object is sensed, and wherein a change in location at which the object is sensed causes a corresponding change in the displayed location of the first graphic element;
 cause the display to display a second graphic element in response to sensing the object in near-proximity to the second region of the display, wherein a displayed location of the second graphic element is within the second region of the display, and wherein the second graphic element is different than the first graphic element and indicates a first direction for scrolling the content;

cause the display to display a third graphic element in response to sensing the object in near-proximity to the third region of the display, wherein a displayed location of the third graphic element is within the third region of the display, wherein the third graphic element is different than the first graphic element and indicates a second direction for scrolling the content, and wherein the first direction is different from the second direction;

cause scrolling of the content in the first direction in response to sensing that the object is in near-proximity to the second region of the display; and cause scrolling of the content in the second direction in response to sensing that the object is in near-proximity to the third region of the display.

42. The mobile terminal of claim 41, wherein the first region is adjacent to the second region at a first border, wherein the first region is adjacent to the third region at a second border; and wherein the first border and the second border are physically unobstructed such that information displayed on the display at the first and second borders is visually viewable.

43. The mobile terminal of claim 41, wherein the content comprises information that is currently displayed on the display, and information that can be displayed on the display in response to sensing that the object is in near-proximity to the second region or the third region of the display.

44. The mobile terminal of claim 41, wherein the controller is configured to:

scroll the content in the first direction as long as the object stays in near-proximity to the second region of the display;

scroll the content in the second direction as long as the object stays in near-proximity to the third region of the display;

terminate scrolling the content in the first direction when the object is no longer in near-proximity to the second region of the display; and terminate scrolling the content in the second direction when the object is no longer in near-proximity to the third region of the display.

45. The mobile terminal of claim 41, wherein the scrolling of the content in either of the first direction or the second direction causes the content to scroll through the first region, the second region, and the third region, and wherein the displayed second graphic element and the displayed third graphic element obscures a portion of the content.

46. The mobile terminal of claim 41, wherein the controller controls a scroll speed according to a distance of the sensed object away from the display.

* * * * *